US007749934B2

(12) United States Patent
Even et al.

(10) Patent No.: US 7,749,934 B2
(45) Date of Patent: Jul. 6, 2010

(54) PROTECTED CATALYTIC COMPOSITION AND ITS PREPARATION AND USE FOR PREPARING POLYMERS FROM ETHYLENICALLY UNSATURATED MONOMERS

(75) Inventors: Ralph Craig Even, Blue Bell, PA (US); Willie Lau, Lower Gwynedd, PA (US)

(73) Assignee: Rohm and Haas Company, Rhiladelphia, PA (US)

( * ) Notice: Subject to any disclaimer, the term of this patent is extended or adjusted under 35 U.S.C. 154(b) by 1192 days.

(21) Appl. No.: 11/340,040

(22) Filed: Jan. 26, 2006

(65) Prior Publication Data

US 2006/0189479 A1 Aug. 24, 2006

Related U.S. Application Data

(60) Provisional application No. 60/655,186, filed on Feb. 22, 2005.

(51) Int. Cl.
*B01J 31/00* (2006.01)

(52) U.S. Cl. ........................ 502/159; 502/150; 502/152

(58) Field of Classification Search .................. 502/159
See application file for complete search history.

(56) References Cited

U.S. PATENT DOCUMENTS 3,845,029 A 10/1974 Throckmorton et al.
4,100,003 A * 7/1978 Trusch ........................ 156/54
4,429,085 A 1/1984 Henderson et al.
4,506,031 A 3/1985 Henderson et al.
4,517,307 A * 5/1985 Cuffiani et al. .............. 502/119
4,902,741 A 2/1990 Burroway et al.
5,362,416 A 11/1994 Costa
5,767,034 A * 6/1998 Diaz-Barrios et al. ....... 502/132
5,986,025 A * 11/1999 Huh et al. ................... 526/119
5,986,026 A 11/1999 Wong et al.
6,303,724 B1 10/2001 Goodall et al.
6,696,519 B2 2/2004 Brown et al.
6,747,102 B1 6/2004 Christie et al.
7,037,987 B2 5/2006 Goodall et al.
7,087,687 B2 8/2006 Goodall et al.
7,153,915 B2 12/2006 Clikeman et al.
2004/0097672 A1 5/2004 Claverie et al.
2005/0250878 A1 * 11/2005 Moore et al. ................ 523/211

FOREIGN PATENT DOCUMENTS

CA 1272473 B 5/2009
WO WO 2004/005354 A1 1/2004
WO WO 2005/003191 A 1/2005

OTHER PUBLICATIONS

Hisao Ono et al., "Stereoregular Emulsion Polymerization of Butadiene," *Journal of Polymer Science*: Part A, Polymer Chemistry, 2000, vol. 38, 1083-1089.

Bart Manders et al., "No Polymerization with Metallocenes in Water?—A Prejudice is Refuted," *Agnew Chem. Int. Ed.*, 2001, vol. 40, No. 21, 4006-4007.

R. Soula et al., "Catalytic Polymerization of Ethylene in Emulsion," *Macromolecules*, 2001, vol. 34, 2022-2026.

Florian M. Bauers et al., "High Molecular Mass Polyethylene Aqueous Latexes by Catalytic Polymerization," AGNEW, *Chem. Int. Ed.*, 2001, vol. 40, No. 16, 3020-3022.

Anke Held et al., "Aqueous Polyketone Latices with Water-Insoluble Palladium(II) Catalysts," *Macromolecules*, 2002, vol. 35, 3342-3347.

R. Soula et al., "Catalytic Copolymerization of Ethylene and Polar and Nonpolar α-Olefins in Emulsion," *Macromolecules*, 2002, vol. 35, 1513-1523.

Florian M. Bauers et al., "Catalytic Polymerization of Ethylene in Aqueous Emulsion with a Simple in Situ Catalyst," *Macromolecules*, 2003, vol. 36, 6711-6715.

* cited by examiner

*Primary Examiner*—Melvin C Mayes
*Assistant Examiner*—Yun Qian
(74) *Attorney, Agent, or Firm*—James G. Vouros; Thomas S. Deibert

(57) ABSTRACT

A method for polymerizing ethylenically unsaturated monomers, including non-polar olefinic monomers, polar olefinic monomers, and combinations thereof, using a protected catalytic composition in an aqueous medium, is disclosed. An aqueous dispersion containing the protected catalytic composition is also disclosed, along with an aqueous dispersion of the addition polymer produced by the polymerization.

10 Claims, No Drawings

PROTECTED CATALYTIC COMPOSITION AND ITS PREPARATION AND USE FOR PREPARING POLYMERS FROM ETHYLENICALLY UNSATURATED MONOMERS

This patent application derives priority from U.S. Patent Application Ser. No. 60/655,186, filed Feb. 22, 2005.

The present invention relates to a method for polymerizing ethylenically unsaturated monomers, including non-polar olefinic monomers, polar olefinic monomers, and combinations thereof, using a protected catalytic composition in an aqueous medium.

The use of organometallic complexes to catalyze the polymerization of ethylenically unsaturated monomer in the presence of aqueous media presents a number of problems. It is generally important that there be a uniform distribution of the catalyst complex throughout the reaction mixture, and that water sensitive organometallic complexes must be protected against hydrolysis before and during the polymerization. Techniques such as: formation of miniemulsions of catalyst/monomer/solvent, prepolymerization to microencapsulate the catalyst complexes, and microencapsulation in wax have been used to sequester water sensitive catalyst complexes. Unfortunately, prepolymerization can be difficult to control; solvent droplets limit the vulnerability of many organometallic complexes only slightly, and, in its molten state, wax is no better as a protective medium, or only slightly better, than a simple solvent.

We have surprisingly discovered that the incorporation of an organometallic catalyst component into a protective substance, which can be a low molecular weight amorphous saturated polymer or macromonomer, protects the organometallic catalyst component from decomposition during and after formation of an aqueous dispersion, and further protects droplets containing the organometallic catalyst component from becoming destabilized.

One aspect of the present invention is directed to a method for preparing a protected catalytic composition comprising the steps of:

A) providing a protective substance; and

B) combining said protective substance with an organometallic catalyst component and, optionally, a fugitive substance, to form a protected catalytic composition, wherein:

said protective substance is a polymer having:

a) a crystallinity at 25° C. of at least 0% by weight and no more than 25% by weight, based on the total weight of said protective substance;

b) a number average molecular weight of at least 1,000 g/mole and no more than 100,000 g/mole;

c) a water solubility at 25° C. of at least 0 millimoles of monomer present, as polymerized units, in said protective substance/liter of water, and no more than 150 millimoles of monomer present, as polymerized units, in said protective substance/liter of water; and d) a viscosity of at least 1 centipoise and no more than 1,000,000 centipoise at 25° C.;

said fugitive substance is miscible with said protective substance and has a boiling point at 101 kPa of at least −165° C. and no more than 80° C.; and said protected catalytic composition has a viscosity of at least 1 centipoise and no more than 10,000 centipoise at 25° C.

A second aspect of the present invention is directed to the method of the first aspect supra comprising the further steps of:

C) mixing said protected catalytic composition with an aqueous medium, a dispersant, and, optionally, a thickener, to form an aqueous protected catalytic composition dispersion comprising plural droplets of said protected catalytic composition; and D) when said fugitive substance is present in said aqueous protected catalytic composition, removing said fugitive substance from said aqueous protected catalytic composition.

A third aspect of the present invention is directed to the method of the second aspect supra comprising further steps of:

E) contacting said protected catalytic composition with an ethylenically unsaturated monomer; and F) polymerizing at least a portion of said ethylenically unsaturated monomer to form an aqueous addition polymer dispersion comprising plural polymer particles comprising addition polymer.

A fourth aspect of the present invention is directed to the protected catalytic composition of the first aspect supra.

A fifth aspect of the present invention is directed to the aqueous protected catalytic composition dispersion of the second aspect supra.

The terminology of this specification includes words specifically mentioned herein, derivatives thereof, and words of similar import.

Used herein, the following terms have these definitions:

The words “a” and “an” as used in the specification mean “at least one.”

“Range”. Disclosures of ranges herein take the form of lower and upper limits. There may be one or more lower limits and, independently, one or more upper limits. A given range is defined by selecting one lower limit and one upper limit. The selected lower and upper limits then define the boundaries of that particular range. All ranges that can be defined in this way are inclusive and combinable, meaning that any lower limit may be combined with any upper limit to delineate a range.

An “organometallic catalyst component” is any organometallic complex capable of participating as a catalyst during the polymerization of one or more ethylenically unsaturated monomers. It is understood that some organometallic catalyst components will be capable of polymerizing a certain monomer, or combinations of monomers, while being incapable of polymerizing others. For example, a metallocene catalyst may be capable of catalyzing the polymerization of a non-polar olefin such as ethylene or alpha-olefin, yet incapable of catalyzing the polymerization of a polar olefin such as a (meth)acrylate.

The “protective substance” of the present invention is any polymer having: a “degree of crystallinity” at 25° C. of 0 percent by weight, at least 0.01 percent by weight, or at least 0.1 percent by weight; and no greater than 25 percent by weight, no greater than 10 percent by weight, or no greater than 1 percent by weight, based on the total weight of the protective substance. The degree of crystallinity of the polymer may further by exactly zero, as indicated by the absence of a peak attributable to melting or crystallization during analysis by differential scanning calorimetry (“DSC”). The protective substance of the present invention further has a number average molecular weight of: at least 1,000, at least 1,500, at least 2,000, or at least 6,000 g/mole; and no more than 100,000, no more than 20,000, no more than 10,000, no more than 8,000 g/mole, as determined by Gel Permeation Chromatography (“GPC”). The protective substance further has a MWD polydispersity, determined by GPC, of: at least 1.00, at least 1.01, at least 1.1, or at least 1.25; and no greater than 50, no greater than 5, no greater than 3, or no greater than 1.3. The viscosity of the protective substance is at least 1, at least 10, at least 100 centipoise, at least 500, or at least 1,000 centipoise; and no more than 1,000,000, no more than 100,000, no more than 20,000, no more than 10,000, no more than 5,000, or no more than 2,000 centipoise at 25° C.

A "protected catalytic composition" is a solution, or non-aqueous dispersion, of an organometallic catalyst component in a protective substance. A protected catalytic composition may, optionally, include a fugitive substance.

An "aqueous protected catalytic composition dispersion" ("Protected catalytic dispersion") is formed, in the presence of a dispersant, by dispersing a "protected catalytic composition" in an aqueous medium.

A "dispersant" is an substance capable of stabilizing hydrophobic droplets and polymer particles in an aqueous dispersion through interacting with both the hydrophobic droplet, or polymer particle, and the aqueous phase, thereby stabilizing the interface between them and, in turn, the entire dispersion. Surfactants are a type of dispersant typically used to stabilize droplets and polymer particles having an average diameter of one micron or less. Suspending agents are a type of dispersant typically used to stabilize droplets and polymeric particles having an average diameter of greater than one micron.

A "fugitive substance" is any substance which: exhibits miscibility with a protective substance; when combined with a protected catalytic composition, does not cause gross precipitation of the organometallic catalyst component from the protected catalytic composition such that dissolution, or stable non-aqueous dispersion of the organometallic catalyst component within the protected catalytic composition, is maintained; does not act as a catalyst inhibitor; and has sufficiently high volatility to allow its removal from the aqueous protected catalytic composition dispersion before addition of ethylenically unsaturated monomers. A fugitive substance is inert to the protected catalytic composition and is not an ethylenically unsaturated monomer. Incorporation of a fugitive substance into a protected catalytic composition prior to combination of that protected catalytic composition with an aqueous medium, lowers the viscosity of the protected catalytic composition. This lowering of viscosity facilitates droplet formation during emulsification, or during formation of a dispersion by other means, minimizing the average size of the plural droplets of protected catalytic composition which can be formed under a given set of conditions of dispersion formation. Removal of the fugitive substance, in turn, results in an increase in the viscosity within the protected catalytic composition droplets, thereby enhancing protection of the organometallic catalyst component from aqueous degradation.

The term "ethylenically unsaturated monomer" refers to a molecule having one or more carbon-carbon double bonds which is capable of being polymerized in the presence of an organometallic catalyst component, wherein the organometallic catalyst component acts as: a polymerization catalyst; a chain transfer agent; or both. The term "monoethylenically unsaturated monomer" refers to an ethylenically unsaturated monomer having one such carbon-carbon double bond. The term "multiethylenically unsaturated monomer" refers to an ethylenically unsaturated monomer having two or more such carbon-carbon double bonds.

The term "non-polar olefinic monomer" (alternatively "non-polar olefin") refers to an ethylenically unsaturated monomer consisting exclusively of hydrogen and carbon atoms. The non-polar olefinic monomer of the present invention is any non-polar olefinic monomer capable of being polymerized, in the presence of an organometallic catalyst component of the present invention, to form a "poly(non-polar olefin)" or, when a polar olefinic monomer is copolymerized with the non-polar monomer, a "poly[(polar olefin)-(non-polar olefin)]".

The term "polar olefinic monomer" (alternatively "polar olefin") refers to an ethylenically unsaturated monomer including at least one atom other than carbon or hydrogen. The polar olefinic monomer of the present invention is any polar olefinic monomer capable of being polymerized, in the presence of an organometallic catalyst component of the present invention, to form a "poly(polar olefin)" or, when a non-polar olefinic monomer is copolymerized with the polar monomer, a "poly[(polar olefin)-(non-polar olefin)]".

It is understood that, in the presence of an organometallic catalyst component of the preset invention: one or more non-polar olefinic monomers may be polymerized, to form a poly (non-polar olefin); one or more polar olefinic monomers may be polymerized to form a poly(polar olefin); and one or more polar olefinic monomers and one or more non-polar olefinic monomers may be copolymerized to form a poly[(polar olefin)-(non-polar olefin).

The term "(meth)acryl" refers to both "acryl" and "methacryl". For example, "butyl (meth)acrylate" refers to both "butyl acrylate" and "butyl methacrylate". "(Meth)acryl" type monomers are examples of the "polar olefinic monomer" of the present invention.

An "addition polymer" is a polymer capable of being prepared by addition polymerization, and selected from the group consisting of poly(non-polar olefin), poly(polar olefin), poly[(polar olefin)-(non-polar olefin)], and combinations thereof.

A "poly(non-polar olefin)" is a polymer comprising one or more non-polar olefinic monomers, as polymerized units. As such, a "poly(non-polar olefin)" may be a homopolymer or a copolymer, and the copolymer may be, for example, a random, alternating, or block copolymer.

A "poly(polar olefin)" is a polymer comprising, as polymerized units, one or more polar olefinic monomers. As such, a "poly(polar olefin)" may be a homopolymer or a copolymer, and the copolymer may be, for example, a random, alternating, or block copolymer.

A "poly[(polar olefin)-(non-polar olefin)]" is a copolymer comprising one or more non-polar olefinic monomers and one or more polar olefinic monomers, as polymerized units, and the copolymer may be, for example, a random, alternating, or block copolymer. The addition polymer of the present invention is a polymer selected from the group consisting of: poly(non-polar olefin), poly(polar olefin), poly[(polar olefin)-(non-polar olefin)], and combinations thereof.

It is understood that the suitability of a given ethylenically unsaturated monomer for use in a given polymerization reaction will depend upon: its susceptibility to being polymerized in the presence of a given organometallic catalyst component; its ability to copolymerize with other ethylenically unsaturated monomers contemplated for use; and the performance properties desired in the polymer produced by the polymerization. It is further understood that an ethylenically unsaturated monomer will be unsuitable for use with a given organometallic catalyst component if that monomer functions as a "catalyst inhibitor" for that organometallic catalyst component unless a way can be found to deactivate the inhibiting effect by, for example, modifying the composition of the organometallic catalyst component or masking the inhibiting functional groups of the ethylenically unsaturated monomer.

A "catalyst inhibitor" is a substance that can interact with an organometallic catalyst component in such a way that the ability of that organometallic catalyst component to act as a polymerization catalyst, or, alternatively, as a chain transfer catalyst, or both, is destroyed or diminished. For example, ethylenically unsaturated monomers bearing polar groups, such as (meth)acrylates, are typically catalyst inhibitors for Ziegler-Natta and metallocene complexes. Polar groups may simply coordinate too strongly to a site in the organometallic catalyst component which must be available to additional monomer, such that the insertion addition mechanism is interrupted and chain growth is stopped or greatly impeded. Water, as well as other components which may be present in an aqueous medium, may also act as catalyst inhibitors coordinating too strongly to the organometallic catalyst component, or by transforming that component to a species that is inactive as a catalyst.

Solubility in water, or aqueous media, is described as follows herein. Herein, the volume term "liter" in the denominator refers to liters of aqueous medium used to dissolve the solute. Herein, the use of the term "millimoles" in definitions of water solubility has its usual meaning regarding non-polymeric substances. For example, the weight of octane contained in one mole of octane is simply given in the expression for the molecular weight of octane (i.e., 114 grams/mole). Therefore, one millimole of octane is equal to 0.114 g. If, at a some temperature, octane has a "molar solubility" in a given aqueous medium of 1 millimole/liter, then its "weight solubility" in that aqueous medium at that temperature, would be 0.114 g/liter. Similarly, the nonpolar olefinic monomer 1-octene has a molecular weight of 112 grams/mole, and one millimole of 1-octene is equal to 0.112 g. If, at some temperature, 1-octene has molar solubility in a given aqueous medium of 1 millimole/liter, then its weight solubility in that aqueous medium would be 0.112 g/liter. Herein, for addition polymers and protective substances (including macromonomers) of the present invention, water solubility is expressed, as the number of millimoles of total monomer present, as polymerized units, in the soluble polymer in that aqueous medium at that 25° C. For example, if the weight of poly(1-octene) soluble in an aqueous medium were determined to be 0.112 g/liter at a some temperature, the "aqueous molar solubility" of the poly (1-octene), based on moles of 1-octene present, as polymerized units, in the poly(1-octene) would be 1.0 millimoles/liter, and this would be true regardless of the number average molecular weight, Mn, of the poly(1-octene). In contrast, if a calculation of aqueous molar solubility were based on the Mn of the polymer [in this illustrative example, poly(1-octene)], an aqueous molar solubility of 0.2 millimole/liter for two poly(1-octene)s, one having an Mn value of 2600 and the other having an Mn value of 25000, would indicate the widely differing weight solubility values of 0.52 g/l and 5.00 g/l, respectively. To avoid this confusion, the aqueous molar solubility of addition polymers, oligomers, and macromonomers of the present invention will be expressed based upon the number of moles of the ethylenically unsaturated monomer present, as polymerized units, in the weight of addition polymer, oligomer, or macromonomers soluble in the aqueous medium under a particular set of conditions. For the purpose of expressing aqueous molar solubility for polymers, oligomers, and macromonomers of the present invention, the calculation will not be based upon the number average molecular weight, Mn, or any other polymer molecular weight determination.

A "compatibilizer" is a low molecular weight polymer bearing at least two compositionally different polymeric blocks, at least two blocks of which are miscible with different polymers. Guidance in choice of a suitable compatibilizer to compatibilize a given protective substance with a given polymer, or a given mixture of polymers, can be estimated by the methods of Van Krevelen described infra.

A "transport agent" is a substance that has solubility in water, yet has the ability to complex weakly or strongly with a water-insoluble substance, such that a "transport adduct" is formed which is soluble enough in the aqueous phase of an aqueous dispersion that the water-insoluble substance can be transported across that aqueous phase of the aqueous dispersion.

A "transport enhancing solvent" is a water miscible solvent which, when combined with the aqueous phase of the polymerization mixture of the present invention, is capable of increasing the solubility of at least one of the ethylenically unsaturated monomers in that aqueous phase, with the result that transport of the ethylenically unsaturated monomer(s) through the aqueous phase to the droplets of protected catalytic composition is enhanced.

Estimation of whether a given polymer will be soluble in a another given polymer, or a given small non-polymeric molecule may be made according to the well-known methods delineated in D. W. Van Krevelen, *Properties of Polymers,* 3rd Edition, Elsevier, pp. 189-225, 1990. For example, Van Krevelen defines the total solubility parameter ($\delta_t$) for a substance by:

$$\delta_t^2=\delta_d^2+\delta_p^2+\delta_h^2,$$

where $\delta_d$, $\delta_p$, and $\delta_h$ are the dispersive, polar, and hydrogen bonding components of the solubility parameter, respectively. Values for $\delta_d$, $\delta_p$, and $\delta_h$ have been determined for many solvents and polymers, and can be estimated using the group contribution methods of Van Krevelen. To estimate whether a linear low molecular weight polymer (e.g., Mn<20,000) and a small non-polymeric molecule (e.g., Mn<500) will be mutually soluble in one another, one calculates $\delta_t^2$ for each. If the difference between the two, $\Delta\delta_t^2$, is greater than 25 (i.e., $\Delta\delta_t>5$), then the low molecular weight polymer and the small molecule should be insoluble in each other. This is also the case for two polymers, each having a low molecular weight, for example, Mn<20,000. When the Van Krevelen calculation is done for polymers having higher and higher molecular weights, lower and lower values of $\Delta\delta_t^2$ will indicate the onset of immiscibility, such that two high molecular weight polymers (e.g., polymers having Mn>100,000) may be immiscible even when $\Delta\delta_t^2$, is as low as 9 (i.e., $\Delta\delta_t$ as low as 3), or in some cases, even as low as 4 (i.e., $\Delta\delta_t$ as low as 2). Given that the organometallic catalyst component and the protective substance of the present invention are, respectively, a small molecule and a low molecular weight polymer, one would estimate that miscibility would occur for calculated values for $\Delta\delta_t^2$ ranging from 0 to 16, or even 25 (i.e., $\Delta\delta_t$ is 0 to 4 or even 5). When a fugitive substance is used, determination of whether a given fugitive substance, which is a small molecule, will be miscible with either the protective substance, the organometallic component, or both may be accomplished in like fashion. Estimation of miscibility of polymeric blocks contained in compatibilizers with specific polymers may similarly be made using the methods of Van Krevelen.

The following expressions for the molecular weight of a collection of polymer chains describe the "weight average molecular weight", "$M_w$" and the "number average molecular weight", "$M_n$". These are defined as follows:

$$M_w=\Sigma(W_iM_i)/\Sigma W_i=\Sigma(N_iM_i^2)/\Sigma N_iM_i$$

$$M_n=\Sigma W_i/\Sigma(W_i/M_i)=\Sigma(N_iM_i)/\Sigma N_i$$

where:

$M_i$=molar mass of $i^{th}$ component of distribution $W_i$=weight of $i^{th}$ component of distribution $N_i$=number of chains of $i^{th}$ component and the summations are over all the components in the distribution. $M_w$ and $M_n$ are typically computed from the MWD as measured by Gel Permeation Chromatography (see the Experimental Section). The value for "$M_w/M_n$" is referred to as the "MWD polydispersity".

The "average diameter" ("ave. diam.") determined for a collection of polymer particles is approximately, or identically, "the weight average particle size", "$d_w$", also described herein below. The "average diameter" may be used when referring to a distribution of plural droplet of protected catalytic composition or to a distribution of plural polymer particles.

Herein, the term "particle size distribution" and the acronym "PSD" are used interchangeably. Used herein, "PSD polydispersity" is a description of the distribution of particle sizes for the plural polymer particles of the invention. PSD polydispersity is calculated from the weight average particle size, $d_w$, and the number average particle size, $d_n$, according to the expressions:

$$\text{PSD Polydispersity}=(d_w)/(d_n),$$

$$\text{where } d_n=\Sigma n_i d_i/\Sigma n_i$$

$$d_w=\Sigma n_i d_i d_i/\Sigma n_i d_i, \text{ and}$$

where $n_i$ is the number of particles having the particle size $d_i$

A "monodisperse" distribution (herein, MWD or PSD) refers to a distribution having a polydispersity of exactly 1.

A "supercritical fluid" ("SCF") is a substance above its critical temperature and critical pressure (i.e., its "critical point"). For carbon dioxide, the critical temperature is 31° C. and the critical pressure is 1070 psi. Above the critical point of a fluid, further compression does not cause formation of a liquid (see *Chem. Rev.,* 1999, 99, pp. 565-602).

It will be appreciated by those skilled in the art that changes could be made to the embodiments described herein without departing from the broad inventive concept thereof. It is understood, therefore, that this invention is not limited to the particular embodiments disclosed, and that recitation of the particular embodiments is intended to cover modifications within the spirit and scope of the present invention as defined by the appended claims.

The "organometallic catalyst component" of the present invention can be any "organometallic complex capable of catalyzing the polymerization of one or more ethylenically unsaturated monomers" ("organometallic polymerization catalyst"), provided that the organometallic complex is stable to the conditions of protected catalytic composition preparation, aqueous protected catalytic composition dispersion, and polymerization. The organometallic complex is a neutral or cationic complex, (i.e., the complex has an overall neutral or cationic charge; and when the charge is cationic, the charge of the cationic complex will be balanced by a weakly coordinating anion). The solubility of the organometallic catalyst component in water at 25° C. is: 0, at least 0.1, at least 1, or at least 5 mmoles/liter of water; and no more than 500, no more than 150, no more than 50, no more than 25, or no more than 10 mmoles/liter of water. The metals of the organometallic complex are selected from late transition metals of transition element Groups VIII, IX, and X of the Periodic Table of the Elements; from Fe, Co, Ni, Pd, Rh, or Cu; Ni, Pd, or Rh; or Ni or Pd. The organometallic complex can be monometallic, bimetallic, or multimetallic. When an organometallic complex includes more than one metal, the multiple metals may be the same or different. A non-exhaustive list of examples of the organometallic complex of the present invention is found in FIGS. I-V. The ligands of the organometallic complex include at least one chelating ligand (i.e., a ligand that is bidentate or multidentate), and the ligands are neutral or anionic. Depending upon the availability of metal coordination sites after coordination of a chelating ligand to a metal of the complex is taken into consideration, a monodentate ligand may, optionally, be included in the complex. The "chelating ligand" of the present invention has at least two heteroatoms independently selected from P, N, O, and S. A non-exhaustive list of chelating ligands includes bidentate anionic P, O ligands such as carboxylic phosphines (e.g., see FIG. I complexes) and enolato phosphines (e.g., see FIG. II complexes); N, O ligands such as salicylaldiminato ligands (e.g., see FIG. III complexes); α-diimine ligands such as sterically hindered diimines (e.g., see FIG. IV complexes); azacycloalkane ligands such as 1,4,7,trimethyl-1,4,7-triazacyclononane, or diarylphosphinobenzene-2 sulfonic acid ligands (e.g., see FIG. V complexes). Ligand L in FIGS. I-V is an auxiliary ligand. Pyridine, triphenylphosphine, olefins, and acetonitrile are examples of auxiliary ligands useful in the present invention.

I

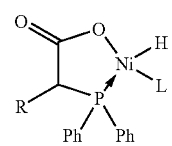

R = Ph

L = pyridine, PPh3, olefin acetinitrile

II

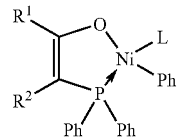

$R^1$ = Ph, $CF_3$ $R^2$ = $SO_3Na$, $CO_2Et$

L = pyridine, PPh3, olefin, acetinitrile

III

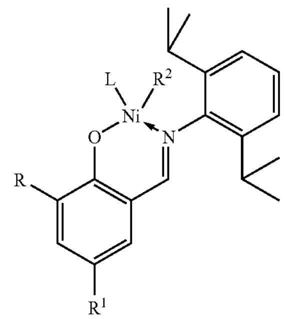

R = H, t-Bu, Ph, 9-phenanthrene, 9-anthracene, $NO_2$, Cl, Br $R^1$ = H, t-Bu, $NO_2$, Cl, Br $R^2$ = Ph, Me L = $PPh_3$, $CH_3$ -continued

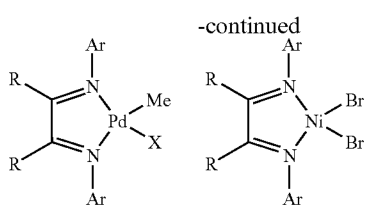

IVa IVb

R = Me, H,

Ar = 2,6-diisopropylphenyl
2,6, dimethylphenyl

X = Me, Br, Cl

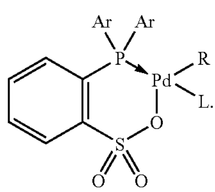

V

Ar = o-methoxyphenyl

R = Me

L = pyridine

The organometallic catalyst component may further include an "activator". Organometallic catalyst components, including ligands suitable for inclusion in those complexes, capable of catalyzing polymerization of ethylenically unsaturated monomers according to the method of the present invention, include, for example, those disclosed in U.S. Serial Nos. US200410857330, US200511140287, and US20050277569, as well those disclose in *Prog. Polym. Sci.* 2003, 28, 619-662 and in the references disclosed therein, and in *Late Transition Metal Polymerization Catalysis*, Rieger, B., Saunders Baugh, L, Kacker, S., and Striegler, S., Eds.; Wiley-VCH: Weinheim, Germany, 2003.

Alternatively, the organometallic catalyst component of the present invention can be a "transition metal chelate chain transfer agent", such as a metal chelate (e.g., cobalt chelate) disclosed as chain transfer agents for free radical polymerizations U.S. Pat. No. 5,962,609 and U.S. Pat. No. 4,746,713. Preferably, the transition metal chelate chain transfer agent ("CTA") is a cobalt (II) or (III) chelate complex such as, for example, dioxime complexes of cobalt, cobalt II porphyrin complexes, or cobalt II chelates of vicinal iminohydroxyimino compounds, dihydroxyimino compounds, diazadihydroxy-iminodialkyldecadienes, or diazadihydroxyiminodialkylundecadienes, or combinations thereof. These complexes may optionally include bridging groups such as BF2, and may also be optionally coordinated with ligands such as water, alcohols, ketones, and nitrogen bases such as pyridine. Additional suitable transition metal chelate CTAs are disclosed in for example U.S. Pat. Nos. 4,694,054; 4,746,713; 5,770,665; 5,962,609; and 5,602,220. In one embodiment, the cobalt transition metal chelate CTA complex useful in the present invention is Co II (2,3-dioxyiminobutane-BF2) 2, the Co III analogue of the aforementioned compound, or combinations thereof. The spatial arrangements of such complexes are disclosed in for example EP-A-199436 and U.S. Pat. No. 5,756,605.

Provided that it conforms to the criteria just enumerated, the protective substance may contain, as polymerized units, any of the ethylenically unsaturated monomers used to prepare the addition polymer of the present invention. As such, the protective substance may be selected from the group consisting of poly(non-polar olefin), poly(polar olefin), poly [(polar olefin)-(non-polar olefin], and combinations thereof. The protective substance may be a fully saturated polymer, meaning that the polymer has no carbon-carbon double bonds available for polymerization. The protective substance may further be a polymer prepared by any means known in the art, including, for example, insertion addition polymerization, free radical polymerization, and condensation polymerization. The protective substance may, alternatively, be a macromonomer, wherein the macromonomer is a polymer having at least one point of ethylenic unsaturation available for polymerization and, hence, incorporation into a growing polymer chain. In one embodiment, the protective substance is a poly (polar olefin) prepared by free radical polymerization. In another embodiment, the protective substance is a macromonomer prepared from a polar olefin by free radical polymerization in the presence of a metal chelate chain transfer agent. In yet another embodiment, the protective substance is prepare by condensation polymerization using monomer suitable for condensation polymerization, such as those disclosed in U.S. Pat. No. 4,360,376 and U.S. Pat. No. 3,577,515. The protective substance further has a water solubility at 25° C. of: at least 0, at least 1, or at least 10 mmoles/liter of water; and no more than 150, no more than 50, or no more than 25 mmoles/liter of water, expressed as the number of millimoles of total monomer present, as polymerized units, in the protective substance, soluble in one liter of aqueous medium. The protective substance is substantially free of residual ethylenically unsaturated monomer such as might be present in the protective substance after its preparation. "Substantially free of residual ethylenically unsaturated monomer" means that this residual ethylenically unsaturated monomer is present in the protective substance, prior to formation of the protected catalytic composition, in the weight ratio of: at least 0, at least 0.000001, at least 0.00001, or at least 0.0001; and no more than 5.0, no more than 0.05, no more than 0.01, no more than 0.001, or no more than 0.0002, wherein the weight ratio is the ratio of the weight of the residual ethylenically unsaturated substance to the weight of protective substance.

The protective substances of the present invention may be prepared by any means known to the art including, for example, bulk, solution, emulsion, mini-emulsion, microemulsion, or suspension polymerization processes. A variety of chain transfer agent may be employed to regulate chain length. According to one embodiment, the chain transfer agent is selected from mercaptans (e.g., C4-C22 linear or branched alkyl mercaptans), polymercaptans, thioesters (e.g., alkyl thioglycolates and alkyl mercaptoalkanoates), halogenated compounds, allyl compounds, organic solvents including but not limited to alcohols, isopropanol, isobutanol, other secondary alcohols, and combinations thereof. In some preferred embodiments the molecular weight of oligomer dispersions is controlled through the use of linear or branched $C_4$-$C_{22}$ alkyl mercaptans such as n-dodecyl mercaptan and t-dodecyl mercaptan. It is also contemplated that the molecular weight of oligomer dispersions may be controlled through the use of catalytic chain transfer agents, such as the cobalt chelate compounds described in U.S. Pat. Nos. 5,962,609 and 4,746,713. According to a separate embodiment, the molecular weight of the oligomer is controlled by isopropyl alcohol as the solvent in a solution polymerization. One skilled in the art will recognized that the protective substances prepared using these chain transfer agents will have terminal moieties or pendant moiteis derived from one or more fragments of the given chain transfer agent. For example, a mercaptan fragment becomes a thioether moiety terminal to the polymer chain of the protective substance. In another example, a secondary alkoxy fragment becomes a secondary alkoxy moiety terminal to the polymer chain of the protective substance. The term "terminal" used herein means at any chain end of a polymer, including the end of the longest chain of adjacent polymerize units of monomer in the polymer chain, and also including the end of any branch chains. The term "pendant" includes moieties directly attached to the polymer chain, but not The "protected catalytic composition", prior to and during mixing with the the aqueous medium to form the protected catalytic dispersion, has a viscosity of at least 0.1, at least 10, or at least 100 centipoise, and no more 10,000, no more than 2,000, or no more than 1,000 centipoise at 25° C. It will be recognized that, when the protected catalytic composition includes a fugitive substance and the fugitive substance is removed after forming the protected catalytic dispersion, removal of the fugitive substance may increase the viscosity of the protected catalytic composition, causing the viscosity to be at least 1, at least 10, at least 100 centipoise, at least 500, or at least 1,000 centipoise; and no more than 1,000,000, no more than 100,000, no more than 20,000, no more than 10,000, no more than 5,000, or no more than 2,000 centipoise at 25° C.

The ratio of organometallic catalyst component to protective substance in the protected catalytic composition is chosen so that the molar ratio of all monomers to be polymerized, during the polymerizing of the present invention, to the organometallic catalyst component is: at least 50:1, at least 200:1, at least 250:1, or at least 1,000:1; and no more than 5,000,000:1, no more than 2,000,000:1, no more than 500,00:1, no more than 250,000:1, or no more than 100,000:1.

The protected catalytic composition may further include an "activator component" provided that activator component is stable under the conditions of the present invention. Illustrative, but non-limiting examples of the "activator component" of the present invention are disclosed in publications of: Chen and Marks, such as *Chem. Rev.* 2000 100, 1391-1434; Coates, such as *Chem. Rev.* 2000 100, 1223-1252; Resconi et al, such as *Chem. Rev.* 2000 100, 1253-1346; Fink et al, such as *Chem. Rev.* 2000 100, 1377-1390; Alt and Koeppl, such as *Chem. Rev.* 2000 100, 1205-1222; and Hlatky, *Chem. Rev.* 2000 100, 1347-1376, the contents of which are usefully employed in accordance with the present invention. A non-exhaustive list of activator components includes, for example: aluminum alkyls; aluminoxanes; hydroxyaluminoxanes; aluminoxinates; organic borane compounds; inorganic borane compounds; and borate anions.

The aqueous protected catalytic composition dispersion is formed by dispersing the protected catalytic composition in an aqueous medium to form a dispersion of plural droplets of the protected catalytic composition. The average droplet size of those plural droplets of protected catalytic composition present in the dispersion is: at least 10 nm, at least 20 nm, at least 40 nm, at least 100 nm, or at least 200 nm; and no more than 2,000 nm, no more than 1,000 nm, no more than 800 nm, or no more than 600 nm when the dispersion is a miniemulsion. The PSD polydispersity of the protected catalytic composition droplets for the dispersion, as a miniemulsion, is: at least 1.01, at least 1.1, at least 1.3, or at least 2; and no more than 50, no more than 10, no more than 5, or no more than 3. Miniemulsions are typically formed by homogenization, including, for example, high pressure homogenization and ultrasonication. When the dispersion is to be a miniemulsion, the droplets of protected catalytic composition will typically be stabilized: by inclusion of a surfactant before, or during formation of the miniemulsion; by inclusion of hydrophilic (e.g., ionic) moieties covalently bound to the polymer chains of the protective substance; or both. Though not wishing to be bound by any particular theory, it is believed that more intense mixing conditions and lower viscosity of the protected catalytic composition, favor formation of plural droplets of protected catalytic composition having smaller average diameters. As a result, such techniques as high pressure homogenization and ultrasonication are typically used to prepare miniemulsions having the ranges of average droplet size just enumerated.

Alternatively, it may be desirable to prepare an protected catalytic dispersion including plural droplets of protected catalytic composition having an average droplet size of: at least 1 micron, at least 2 microns, or at least 10 microns; and no more than 500 microns, no more than 50 microns, or no more than 15 microns. Typically suspending agents will be included before or during the process of forming the dispersion, also referred to as a suspension. The PSD polydispersity of the protected catalytic composition droplets for the dispersion, as a suspension, is: at least 1.1, at least 1.3, or at least 2; and no more than 50, no more than 5, or no more than 3. While, in certain cases, it may still be useful, or even necessary, to prepare dispersions in which the droplets of protected catalytic composition have average sizes of 1 micron or more, by homogenization or ultrasonication, convention mechanical stirring may be adequate to achieve the desired droplet size for some combinations of protected catalytic composition and aqueous medium.

Surfactants useful in the method of the present invention are well known to those skilled in the art, and may be found in, for example, Porter, M. R., Handbook of Surfactants, Chapman and Hall, New York, 1991. Examples of useful surfactants for the present invention include anionic surfactants such as, for example, sodium lauryl sulfate, dioctylsulfosuccinate, sodium polyoxyethylene lauryl ether sulfate, sodium dodecyl benzenesulfonate; and non-ionic surfactants such as, for example, glycerol aliphatic esters, polyoxyethylene aliphatic esters, polyoxyethylene alcohol ethers; and stearic acid monoglyceride. Amphoteric surfactants may also be useful. Amphoteric surfactants bear both acidic and basic functionality and are well known in the art (see, for example, Amphoteric Surfactants, ed. B. R. Bluestein and C. L. Hilton, Surfactant Series Vol. 12 Marcel Dekker NY, N.Y. (1982)). Fluorinated surfactants such as perfluoro-octanoic acid and salts thereof are also useful, particularly for stabilization of fluoropolymers. Silicon surfactants are also useful, especially for stabilizing siloxane polymers. In addition, monomeric surfactants may be incorporated into the polymer chain during polymerization. For example, these monomeric surfactants impart covalently bound surfactant functionality to polymers: nonylphenoxypropenylpolyethoxylated sulphate, sodium alkyl allyl sulfosuccinate, allyl ammonium lauryl 12 EO phosphate, allyl ammonium linear dodecyl benzene sulfonate, and allyl ammonium lauryl sulfate. For the purpose of stabilizing protected catalytic composition droplets and polymer particles of the present invention, surfactants may typically be used at levels of 0.1 percent to 6 percent by weight based on the total weight of those droplets, or polymer particles.

When protected catalytic composition droplets and polymer particles of size greater than 1.0 micron to 1 millimeter are formed, techniques known to those skilled in the art of aqueous suspension polymerization are used to stabilize droplets, to stabilize particles, and to establish average particle size and particle size distribution. In particular, droplets and particles of size greater than 1.0 micron to 1 millimeter are stabilized by dispersants known as suspending agents. Of course, surfactants may have some utility, though usually diminished, for droplet and particle stabilization above 1.0 micron, and suspending agents may have some utility, though usually diminished, at and below 1.0 micron. Therefore, in some cases, combinations of surfactants and suspending agents may be used to advantage.

Suspending agents are also well known in the art. Suspending agents are typically water soluble polymers including, for example, polyvinyl alcohol, poly(N-vinylpyrrolidone), carboxymethylcellulose, gelatin, hydroxyethylcellulose, partially saponified polyvinyl acetate, polyacrylamide, polyethylene oxide, polyethyleneimine, polyvinylalkyl ethers, polyacrylic acid copolymers of polyacrylic acid, and polyethylene glycol. Typically, an amount of suspending agent effective to stabilize droplets and polymer particles having average diameters in the range 1.0 micron to 1 millimeter is 0.1 to 5 weight percent, based on total weight of droplets of polymer particles.

A fugitive substance useful in the present invention may be any substance which: is soluble in the protective substance of the present invention; when combined with the protected catalytic composition, does not cause precipitation of the organometallic catalyst complex from the protected catalytic composition; and does not act as a catalyst inhibitor for the organometallic catalyst component contained in the protected catalytic composition. The fugitive substance has a boiling point at a pressure of 1 atmosphere (101 kPa) of: at least −165° C., at least −130° C., at least −80° C., or at least −10° C.; or no more than 80° C., no more than 50° C., no more than 20° C.; no more than 10° C., or no more than 0° C. The fugitive substance further has a water solubility at 25° C. of: at least 0, at least 1, or at least 10 mmoles/liter of water; and no more than 2,000, no more than 1,000, no more than 150, no more than 50, or no more than 25 mmoles/liter of water. The solubility characteristics of a given fugitive substance with respect to a given protective substance, a given organometallic catalyst component, or a protected catalytic composition formed by combining the protective substance and the organometallic catalyst component can be estimated according to the method of Van Krevelen supra. Typically, when a fugitive substance is present in the protected catalytic composition of the present invention, the proportions of a the organometallic catalyst component to the protective substance, and of the fugitive substance to the protective substance will be selected such that a solution is formed upon mixing, or such that a non-aqueous dispersion of the organometallic catalyst component in a solution of protective substance and fugitive substance is formed. It will further be recognized that such mixtures, though capable of forming a solution or non-aqueous dispersion, may require manipulation of mixing conditions (e.g., agitation, heat), as would be known to one of ordinary skill in the art, to cause solution to occur. The fugitive substance may, for example, be present in the protected catalytic composition: to reduce the viscosity of that protected catalytic composition during formation of the protected catalytic dispersion; or to allow reduction of the droplet diameter of the plural droplets of protected catalytic composition, by removal of the fugitive substance, after formation of that protected catalytic dispersion; or both. The weight ratio of fugitive substance to protective substance in the protected catalytic composition before and during formation of the protected catalytic dispersion is: at least 0, at least 0.001, or at least 0.1; and no more than 100, no more than 20, no more than 10, no more than 1, or no more than 0.5, wherein the weight ratio is the ratio of the weight of fugitive substance to the weight of protective substance in the protected catalytic composition.

In an embodiment of the present invention, the fugitive substance may be removed from the protected catalytic dispersion before addition of the ethylenically unsaturated monomer to the protected catalytic dispersion such that the weight ratio of fugitive substance to protective substance in the protected catalytic composition is reduced to: at least 0, at least 0.0001, or at least 0.01 mmole/liter of protected catalytic dispersion; and no more than 0.5, no more than 0.2, no more than 0.1, or no more than 0.05 mmole/liter of protected catalytic dispersion. An illustrative list of fugitive substances, and their boiling points at a pressure of one atmosphere (i.e., 101 kPa), includes, for example: ethyl acetate (77° C.), hexane (69° C.), methylene chloride (39.8° C.), pentane (36.1° C.), diethyl ether (34.6° C.), 2,2-dimethylypropane (9.5° C.), dichlorofluoromethane (8.9° C.), 1,2-dichlorotetrafluoroethane (3.8° C.), butane (−0.5° C.), 1,1,2,2-tetrafluoroethane (−23° C.), dimethyl ether (−24.8° C.), 1,1-difluoroethane (−25° C.), 1,1,1,2-tetrafluoroethylene (−26.4° C.), hexafluoropropylene (−28° C.), octafluoropropane (−36° C.), chlorodifluoromethane (−40.7° C.), propane (−42.1° C.), propylene (−48° C.), pentafluoroethane (−48.6° C.), difluoromethane (−51.6° C.), sulfur hexafluoride (−63.8° C., sublimes), hexafluoroethane (−78° C.), chlorotrifluoromethane (−81.5° C.), trifluoromethane (−84° C.), ethane (−88° C.), ethylene (−104° C.), tetrafluoromethane (−130° C.), and methane (−161.4° C.). It is further recognized that gases commonly used to create inert conditions during polymerizations (e.g., nitrogen, argon, and helium) are not included in the definition of "fugitive substance". Selection of a fugitive substance is influenced by such considerations as the ranges of temperatures and pressures at which: the protected catalytic composition is prepared and stored; the protected catalytic dispersion is formed; and the fugitive substance is to be removed. It is desirable that the temperature of the protected catalytic dispersion before and during removal of the fugitive substance be lower than the temperature at which significant decomposition of the organometallic catalyst component would occur in that protected catalytic dispersion. It is further desirable to select conditions of temperature and pressure which allow rapid removal of the fugitive substance without causing detrimental foaming, and without destabilizing the protected catalytic dispersion. Given the constraints just recited, the particular evaporative technique used to remove the fugitive substance is not critical. Those evaporative techniques include, for example: sweeping out the fugitive substance with an inert carrier gas such as nitrogen, argon, or helium; a controlled increase of temperature, decrease of pressure, or combination thereof, designed to gradually approach the boiling point of the fugitive substance in a manner that avoids destabilization of the protected catalytic dispersion. It is recognized that variables such as carrier gas sweep rate, temperature, pressure, and defoamer level may be manipulated throughout the process of fugitive substance removal. The suitability of a particular defoamer (e.g., silicon defoaming agents) for a given application will be apparent to one of ordinary skill in the art.

In another embodiment a "thickener" is added to the aqueous medium during preparation of the aqueous dispersion of protected catalytic composition. Without wishing to be bound by any theory, it is believed that, by increasing the viscosity of the aqueous medium and therefore decreasing the viscosity difference between the protected catalytic composition and the aqueous phase, the thickener functions to reduce the average particle size of the plural particles of protected catalytic composition. A non-exhaustive list of "thickeners" includes but is not limited to: alkali soluble (meth)acrylic emulsions (e.g., Rohm and Haas ACRYSOL™ ASE-60); hydrophobically modified alkali soluble (meth)acrylic emulsions (e.g., Rohm and Haas ACRYSOL™ RM-6); hydrophobically modified polyurethane thickeners such as (e.g., Rohm and Haas ACRYSOL™ RM-825); cellulosic thickeners (e.g., hydroxyethyl cellulose NATRASOL™ 250 HR available from Hercules Inc., Aqualon Division, Wilmington, Del.); polyvinyl alcohols, polyacrylamides, polyacids, and combinations thereof.

The non-polar olefinic monomer of the present invention may, for example be any of those disclosed in US patent application Serial Nos. US200410857330, US200511140287, and US20050277569. The non-polar olefinic monomers of the present invention include, but are in no way limited to, unbranched aliphatic olefins having from 2 to 12 carbon atoms, branched aliphatic olefins having from 4 to 12 carbon atoms, unbranched and branched aliphatic α-olefins having from 2 to 12 carbon atoms, conjugated olefins having 4 to 12 carbon atoms, aromatic olefins having from 8 to 20 carbons, unbranched and branched cycloolefins having 3 to 12 carbon atoms, unbranched and branched acetylenes having 2 to 12 carbon atoms, and combinations thereof. A non-exhaustive list of examples of non-polar olefinic monomers of the present invention includes ethylene, propene, 1-butene, 1-hexene, butadiene, 1,5-hexadiene, isoprene, styrene, alpha-methylstyrene, cyclopentene, cyclohexene, cyclohexadiene, norbomene, norbornadiene, cyclooctadiene, divinylbenzene, trivinylbenzene, acetylene, diacetylene, alkynylbenzene, dialkynylbenzene, ethylene/1-butene, ethylene/isopropene, ethylene/1-hexene, ethylene/1-octene, ethylene/propene, ethylene/cyclopentene, ethylene/cyclohexene, ethylene/butadiene, ethylene/1,5-hexadiene, ethylene/styrene, ethylene/acetylene, propene/1-butene, propene/styrene, propene/butadiene, propylene/1-hexene, propene/acetylene, ethylene/propene/1-butene, ethylene/propene/1-hexene, ethylene/propene/1-octene, and various combinations thereof.

The polar olefinic monomer of the present invention may, for example be any of those disclosed in U.S. Serial Nos. US200410857330, US200511140287, and US20050277569. Polar olefinic monomers of the present invention include ethylenically unsaturated monomers having from 2 to 60 carbon atoms and at least one atom such as O, N, B, Al, S, P, Si, F, Cl, Br, and combinations thereof. These polar olefinic monomers include, for example: $C_1$-$C_{22}$ linear or branched chain alkyl (meth)acrylates, bornyl (meth)acrylates, norbornyl (meth)acrylates and isobornyl (meth)acrylate; hydroxyethyl (meth)acrylate, hydroxypropyl (meth)acrylate; (meth)acrylamide or substituted (meth)acrylamides; epoxy containing (meth)acrylates such as glycidyl (meth)acrylate; substituted styrenes; vinyl acetate or other vinyl ester; vinyl chloride; vinylidene chloride; vinylidene fluoride; N-butylaminoethyl (meth)acrylate, N,N-di(methyl)aminoethyl (meth)acrylate; monomers containing α,β-unsaturated carbonyl functional groups such as fumarate, maleate, cinnamate and crotonate; and (meth)acrylonitrile. Acid-functional methacrylic monomers include, for example, (meth) acrylic acid, itaconic acid, crotonic acid, phosphoethyl (meth)acrylate, sulfoethyl (meth)acrylate, 2-acrylamido-2-methyl-1-propanesulfonic acid, fumaric acid, maleic anhydride, monomethyl maleate, and maleic acid. Further examples of polar olefinic monomers include tetrahydrofuranyl and dihydrofuranyl esters of (meth)acrylic acid.

Suitable fluorinated (meth)acrylic monomers useful in the present invention include, but are not limited to: fluoroalkyl (meth)acrylates; fluoroalkylsulfoamidoethyl (meth)acrylate; pentafluoro styrene; fluoroalkyl styrene; vinylidene fluoride; and fluorinated α-olefins. The fluoroalkyl groups used as substituents have from 1 to 20 carbon atoms and from 1 fluorine atom up to and including perfluorinated compositions. Silicon containing polar olefinic monomers useful in the present invention include, for example, trimethoxysilylethyl (meth)acrylate and trimethoxysilylpropyl (meth)acrylate.

Polar olefinic monomers further include α-olefins bearing one or more polar groups, for example, ω-carboxy-α-olefins and 3,3,4,4,5,5,5-heptafluoro-1-pentene. Monocyclic olefins of the present invention may be non-polar olefinic monomers or polar olefinic monomers. Cyclohexene is an example of a non-polar monocyclic olefin, while 3-methoxycyclohexene is an example of a polar monocyclic olefin. Polycyclic monomers of the present invention include both polycyclic monomers that are non-polar olefinic monomers and polar olefinic monomers, Polycyclic monomers suitable for use with the present invention include bicyclic monomers, for example, bicyclo[2.2.1]hept-2-ene also referred to as norbornene. The term "norbornene-type monomer" as used herein is meant to encompass norbornene, substituted norbornene, as well as any substituted and unsubstituted higher cyclic derivatives thereof, provided that the subject monomer contains at least one norbornene-type moiety or substituted norbornene-type moiety.

Multi-ethylenically unsaturated monomers of the present invention may be incorporated into the addition polymer of the present invention to provide crosslinking either during polymerization, or subsequent to polymerization, or both. Multi-ethylenically unsaturated monomers may be polar olefinic or non-polar olefinic monomers, and the ethylenically unsaturated groups may be identical or different. Useful polar multi-ethylenically unsaturated monomers may be any polar multi-ethylenically unsaturated monomer capable of polymerizing under the conditions of polymerization using the organometallic catalyst component of the present invention, and a non-exhaustive illustrative list includes: (meth)acrylic multi-ethylenically unsaturated monomers, for example, allyl (meth)acrylate, 1,4-butylene glycol di(meth)acrylate, 1,6-hexanediol di(meth)acrylate, and 1,1,1-trimethylolpropane tri(methyl)acrylate. Examples of a non-(meth)acrylates include diallyl phthalate and other multi-allylic compounds. Useful non-polar multi-ethylenically unsaturated monomers may be any non-polar multi-ethylenically unsaturated monomer capable of polymerizing under the conditions of polymerization using the organometallic catalyst component of the present invention, and a non-exhaustive illustrative list includes: α,ω-alkadienes, such as 1,9-decanediene; other non-conjugated alkadienes; divinylbenzenes; and molecules containing three or more carbon-carbon double bonds, any two or more of which are capable of participating in polymerization catalyzed by the organometallic catalyst component of the present invention to produce crosslinking in the polymer produced by that polymerization.

While selection of composition and molecular weight for a protective substance to be used in a given embodiment of the present invention includes estimation of compatibility of the candidate protective substance with the addition polymer that will be produced by polymerization in that embodiment, it may further be desirable to assure compatibility by further introducing a compatibilizer. It may further be desirable to introduce a compatibilizer into the protected catalytic composition to compatibilize the addition polymers produced if an immiscible range of polymer compositions results from a given polymerization. Compatibilizers useful in the present invention are graft or block compolymers. When the compatibilizer is a block copolymer, each of at least two of the blocks must be immiscible with one another and selected to be miscible with at least one addition polymer or protective substance of the present invention. Examples of block copolymers commonly used as compatibilizers for polymer blends include, poly(styrene)-block-poly(butadiene), poly(butadiene)-b-poly(methyl methacrylate), and compatibilizers disclosed in: *Multiphase polymer: Blends and Ionomers*, Utracki, L. A., and Weise, R. A., Eds.; American Chemical Society, Washington, D.C., 1989; and *Polymer Blends*, vols. 1 and 2, Paul, D. R., and Bucknall, C. B., Eds.; Wiley-Interscience, New York, 2000. When the compatibilizer is a graft copolymer, the graft copolymer is typically a comb copolymer wherein its backbone and graft segments are immiscible with one another, and each is selected to by miscible with at least one of addition polymer or the protective substance of the present invention.

It is very difficult or impossible for a substance that is insoluble in water to move through the aqueous phase of an aqueous dispersion so that it can reach the surface of a droplet of protected catalytic composition of the present invention, and be imbibed into that droplet. It is the case that may substances, including monomers have a solubility in water at 25° C. of at least 0, at least 1, or at least 10 millimoles/liter; and no more than 250, no more than 150 millimoles/liter, or no more than 50 millimoles/liter, based on the volume of water. In such cases, it may be advantageous to add a "transport agent" to the aqueous phase in the polymerization reactor, or a transport agent may already be present in the protective substance, or in the aqueous medium used in preparing the protected catalytic dispersion. The use of transport agents is described in detail in U.S. Pat. No. 5,976,405. Particularly useful transport agents are macromolecular organic compounds having a hydrophobic cavity. A "macromolecular organic compound having a hydrophobic cavity" is a polymeric molecule, typically cylindrical or approximately cylindrical, which typically has a hydrophilic exterior but has a hydrophobic interior. Such a compound may be used to transport hydrophobic substances (e.g., fluorinated monomers, silicon containing monomers, and non-polar monomers such as ethylene and α-olefins) through an aqueous environment. Macromolecular organic compounds having a hydrophobic cavity, useful in method of the present invention, include cyclodextrin and derivatives thereof; cyclic oligosaccharides having a hydrophobic cavity, such as cycloinulohexose, cycloinuloheptose, and cycloinuloctose; calyxarenes; and cavitands.

The selection of cyclodextrin and derivatives thereof useful in the method of the present invention is determined by the solubility of the cyclodextrin and cyclodextrin derivatives in the aqueous phase, by the similarity in size between the insoluble substance and the hydrophobic cavity of the cyclodextrin, and by the solubility of the species formed by the association of the transport agent with the insoluble substance. Suitable cyclodextrins useful in the method of the present invention include, but are not limited to: α-cyclodextrins, β-cyclodextrins, and γ-cyclodextrins. These cyclodextrins include partially alkylated (e.g., methylated) α-, β-, or γ-cyclodextrins, and combinations thereof. Cyclic oligosaccharides having a hydrophobic cavity, such as cycloinulohexose, cycloinuloheptose, and cycloinuloctose, are described by Takai et al in *Journal of Organic Chemistry,* 59(11), 2967-2975 (1994). The calyxarenes useful in the method of the present invention are described in U.S. Pat. No. 4,699,966. The cavitands useful in the method of the present invention are described in Italian patent application No. 22522 A/89 and by Moran, et al., in Journal of the American Chemical Society, 184, 5826-28 (1982).

The amount of optional transport agent to be used is partly determined by the composition of the transport agent. If the transport agent is a cyclodextrin, the weight ratio of cyclodextrin to insoluble substance (e.g., a total monomer charge) is at least 1:1000, at least 1:500, or at least 1:100, and no more than 10:100, no more than 5:100, or no more than 1:100. The lower limit is determined by such things as the desired rate of transport. The upper limit is determined by the required stability of the aqueous system.

If a "transport enhancing solvent" is used, the amount of that water-miscible solvent contained in the aqueous phase may is: at least 0.1, at least 1, or at least 5 percent by weight, and no more than 30, no more than 20, or no more than 10 percent by weight, based upon the total weight of the aqueous phase.

In the method of polymerizing of the present invention, the "organometallic catalyst component" of the present invention can be used to polymerize: one or more "non-polar olefinic monomers"; one or more "polar olefinic monomers"; or combinations of one or more non-polar olefinic monomers and one or more polar olefinic monomers to form the addition polymer of the present invention. The number average molecular weight, Mn, of the addition polymer of the present invention is: at least 500, at least 1,000, at least 10,000, or at least 20,000; and no more than 5,000,000, no more than 1,000,000, no more than 500,000, or no more than 200,000. The polydispersity of the MWD of the addition polymer of the present invention is: at least 1.000, at least 1.001, at least 1.01, or at least 1.05; and no more than 10, no more than 2.5, no more than 1.5, or no more than 1.1. The MWD of the addition polymer of the present invention may be unimodal or multi-modal, wherein multi-modal includes bimodal and trimodal, as well as higher degrees of modality, and wherein the polydispersity of the MWD for each mode may have the upper and lower limits defined supra.

The method of preparing the addition polymer of the present invention can be carried out at a reaction temperature of: at least 0° C., or at least 10° C., or at least 20° C.; and no more than 200° C., no more than 120° C., no more than 100° C., or no more than 80° C. It will be recognized that reaction temperatures greater than 100° C. will typically require pressures in excess of 1 atmosphere (101 kPa). It will further be recognized that, in the presence of solutes such as, for example, salts (e.g., sodium chloride), the freezing point of the aqueous medium may be depressed to a value which is less than 0° C. In such case, the range of reaction temperatures enumerated supra can extend to a point which is 0.1 degree greater than the freezing point of that aqueous medium. It will also be recognized that, in the presence of solutes, at pressures greater than one atmosphere, or both, the boiling point of the aqueous medium may be elevated to a value which is greater than 100° C. In such case, the range of reaction temperatures enumerated supra can extend to a point which is equal to the boiling point of that aqueous medium. Although the temperature range available for the polymerization reaction may, therefore, extend from 0.1° C. greater than the freezing point of the aqueous medium to the boiling point of the aqueous medium under the conditions of polymerization, it will be recognized that the actual temperature range selected for the polymerization reaction will be determined by the temperature range over which the organometallic catalyst component is capable of catalyzing polymerization. This method can be carried out at a pressure (1 atmosphere=101 kPa) of: at least 1, at least 10, at least 50, or at least 101 kPa; and no more than 100,000, no more than 10,000, no more than 1,000, or no more than 500 kPa. Further, the molar ratio of ethylenically unsaturated monomer to the organometallic catalyst component of present invention is: at least 50:1, at least 200:1, at least 250:1, or at least 1,000:1, and no more than 5,000,000:1, no more than 2,000,000:1, no more than 500,000:1, no more than 250,000:1, or no more than 100,000:1. For gaseous monomers at high pressures, in particular constant high pressures, e.g., equal to or greater than 400 psi, the molar ratio of ethylenically unsaturated monomer to the organometallic catalyst component of present invention may be even higher than 5,000,000:1, for example, no more than 6,000,000:1, no more than 8,000,000:1, or even higher. In the method of polymerization of the present invention, the weight ratio of protective substance to aqueous medium in the protected catalytic dispersion, expressed as weight of protective substance divided by weight of aqueous medium, is: at least 0.001, at least 0.01, or at least 0.02; and no more than 4, no more than 2, no more than 1, or no more than 0.5.

When particles of the addition polymer are produced by the method of preparing the addition polymer of the present invention, depending on the particular details of that method, the addition polymer particles have an average polymer particle diameter which is: at least 10 nm, at least 20 nm, at least 40 nm, at least 100 nm, or at least 200 nm; and no more than 2,000 nm, no more than 1,000 nm, no more than 800 nm, or no more than 600 nm when the protected catalytic dispersion is a miniemulsion. The PSD polydispersity of the protected catalytic composition droplets for the protected catalytic dispersion, as a miniemulsion, is: at least 1.01, at least 1.1, at least 1.3, or at least 2; and no more than 50, no more than 10, no more than 5, or no more than 3. The PSD of the addition polymer of the present invention may be unimodal or multi-modal, wherein multi-modal includes bimodal and trimodal, tetramodal, as well as higher degrees of modality, and wherein the polydispersity of the PSD for each particle size mode may have the upper and lower limits defined supra. Alternatively, larger polymer particle may be prepared by suspension polymerization, and there average polymer particle size is: at least 1 micron, at least 2 microns, or at least 10 microns; and no more than 500 microns, no more than 50 microns, or no more than 15 microns microns. The PSD polydispersity of the polymer particles prepared by suspension techniques is: at least 1.1, at least 1.3, or at least 2; and no more than 50, no more than 5, or no more than 3.

In one embodiment of the present invention an organometallic catalyst component is combined with a protective substance to provide a protected catalytic composition which is a solution, or alternatively a non-aqueous dispersion, of the organometallic catalyst component in the protective substance. The protected catalytic composition may be stored prior to use, or may be used without intervening storage to form an aqueous dispersion containing plural droplets of the protected catalytic composition. If an protected catalytic dispersion is to be formed using homogenization techniques such as, for example, high pressure homgenization or ultrasonication, the aqueous medium and the protected catalytic composition will be homogenized in the presence of a surfactant in an amount sufficient to stabilize the protected catalytic composition droplets formed. The temperatures of the protected catalytic composition and the aqueous medium at the beginning of the homogenization step may be the same or different, and are selected to assure that the viscosity of the protected catalytic composition is sufficiently low during the homogenization step that droplets having the desired average diameter are formed by that homogenization step. It may be desirable to reduce that temperature of the protected catalytic dispersion after it is formed to increase the viscosity within the droplets of protected catalyst composition. This drop in temperature may be accomplished in any manner known to the art, including, for example, contacting the protected catalytic dispersion with a heat exchanger, or by diluting the protected catalytic dispersion with an amount of a second aqueous medium, wherein the second aqueous medium has a lower temperature than that of the protected catalytic dispersion, such that the viscosity of the plural droplets of protected catalytic composition is increased. The second aqueous medium may be free of ethylenically unsaturated monomers. Alternatively, the second aqueous medium may, itself, be an emulsified monomer mix containing all, or a portion, of the monomers to be polymerized. Any amount of ethylenically unsaturated monomer beyond this amount may be added subsequently by any means, including, for example as an emulsified monomer mix, as neat monomer, or other non-aqueous monomer feed. The monomer further be added in gaseous form (e.g., ethylene).

The ethylenically unsaturated monomer may be fed to the protected catalytic dispersion in any manner known to the art. For example, the ethylenically unsaturated monomer may be fed in a single aliquot, or in multiple aliquots, by gradual feed, or some combination of feed schemes. The relative amounts of ethylenically unsaturated monomer fed may vary greatly over time, and may be carried out in a programmed manner. The homogenization and subsequent polymerization may further be carried out in a continuous manner.

In another embodiment of the present invention, an organometallic catalyst component is combined with a protective substance and a fugitive substance to provide a protected catalytic composition which is a solution, or alternatively a non-aqueous dispersion, including the organometallic catalyst component, the protective substance, and the fugitive substance. This protected catalytic composition, further containing a fugitive substance, may be stored prior to use, or may be used without intervening storage to form an aqueous dispersion containing plural droplets of the protected catalytic composition. If an protected catalytic dispersion is to be formed using homogenization techniques such as, for example, high pressure homgenization or ultrasonication, the aqueous medium and the protected catalytic composition will be homogenized in the presence of a surfactant in an amount sufficient to stabilize the protected catalytic composition droplets that are formed by the homogenization technique. The temperatures of the protected catalytic composition and the aqueous medium at the beginning of the homogenization step may be the same or different, and are selected to assure that the viscosity of the protected catalytic composition is sufficiently low during the homogenization step that protected catalytic composition droplets having the desired average diameter are formed by that homogenization step. The presence a fugitive substance in the protected catalytic composition during homogenization adds the condition that the pressure during homogenization be high enough to allow the homogenization step to proceed without destabilization or other disruption due to evaporation of the fugitive substance. (It may even be necessary to use supercritical conditions if certain of the very low boiling fugitive substances are to be advantageously used.) The minimum pressure during homogenization will therefore be determined by the boiling point of the fugitive substance. Once the protected catalytic dispersion is formed, the fugitive substance is removed at a pressure low enough to allow its removal at a given temperature. This pressure will be determined by such factors as the boiling point of the fugitive substance and the stability of the protected catalytic dispersion. Removal of the fugitive substance decreases the concentration of fugitive substance in the plural droplets of protected catalytic composition, typically leading to an increase in the viscosity of those droplets. It may be desirable to maintain the pressure at a constant value during evaporative removal of the fugitive substance, or it may be desirable to vary the pressure. For example, it may be desirable to increase the viscosity of the droplets of protected catalytic composition by evaporation of the fugitive substance at constant, or gradually decreasing, pressure and constant temperature, such that droplet viscosity is increased by decreasing the concentration of fugitive substance in the droplets. In this case, external heating may be applied to offset temperature decrease due to evaporation of the fugitive substance. Alternatively, it may be desirable to allow the temperature to fall within the protected composition dispersion as the fugitive solvent is removed by evaporation, thus increasing the viscosity of the droplets by both removal of fugitive solvent and cooling. Of course, the cooling process can be further accelerated by the use of external cooling. It is further understood that, as the temperature of the protected catalytic dispersion decreases, it may be necessary to further decrease the pressure to maintain an effective rate of evaporation of the fugitive substance.

The second aqueous medium may, itself, be an emulsified monomer mix containing all, or a portion of the monomers to be polymerized. Any amount of ethylenically unsaturated monomer beyond this amount may be added subsequently as an emulsified monomer mix, as neat monomer, or other non-aqueous monomer feed.

In a further embodiment of the present invention, a free-radical polymerization initiator, an organometallic catalyst component, or a combination thereof is added at the end of the polymerization of the present invention to reduce the level of residual monomers in the final aqueous addition polymer dispersion to at least 0, at least 1, or at least 10 weight parts per million; and no more than 1,000, no more than 500, no more than 100, or no more than 50 ppm, based on the weight of that dispersion.

When a polymerization, catalyzed by an organometallic catalyst component, is performed under aqueous miniemulsion conditions, it may further be desirable to utilize one or more of the following techniques designed to enhance one or more performance characteristics of the polymerization and/or addition polymers produced thereby. These techniques may be considered general in that they find utility in miniemulsion polymerizations employing a wide variety of organometallic catalyst components such as, for example, those disclosed in U.S. patent applications US200410857330, US200511140287, and US20050277569, as those disclose in *Prog. Polym. Sci.* 2004, 28, 619-662, and in *Late Transition Metal Polymerization Catalysis*, Rieger, B., Saunders Baugh, L, Kacker, S., and Striegler, S., Eds.; Wiley-VCH: Weinheim, Germany, 2003, as well as in the references disclosed therein. It may, for example, be advantageous to homogenize the aqueous phase of the reaction mixture with the non-aqueous phase, using, for example, a mechanical homogenizer or an ultrasonicator. In this way, the non-aqueous phase may, typically, be dispersed in the aqueous phase as droplets having an average diameter in the range 40 nm to 1000 nm, or even as low as 10 nm, as disclosed in: U.S. Pat. No. 4,902,741; *Macromolecules* 2003, 36, 6711-6715; *Macromolecules* 2002, 35, 3342-3347; *Angew. Chem. Int. Ed.* 2001, 40, No. 16, 3020-3022; and *Macromolecules* 2001, 34, 2022-2026. Because the average droplet sizes typically obtained from such processes are in the range 40 nm to 1,000 nm, or even lower, it may further be advantageous to include a "hydrophobe" in the non-aqueous phase prior to, or during the formation of the miniemulsion. The hydrophobe is highly insoluble in water and serves to stabilize the droplets, once formed, against Ostwald ripening, the tendency of small droplets to combine with one another to form larger droplets. Hydrophobes which have been disclosed as useful for stabilizing droplets of non-aqueous phase before and during miniemulsion polymerization include: C12-C28 saturated hydrocarbons and alcohols, as disclosed in U.S. Pat. No. 4,902,741; hexadecane as disclosed in *Macromolecules* 2001, 34, 2022-2026; polybutene oligomer as disclosed in *Macromolecules* 2002, 35, 1513-1523; and C12-C28 $\alpha$-alkenes and C12-C28 $\alpha,\omega$-alkadienes such as, respectively, 1-hexadecene and $\alpha,\omega$-tetradecadiene, as disclosed in *Macromolecules* 2002, 35, 1513-1523. 1-Hexadecene, molecules of which may be incorporated, as polymerized units, into the growing polymer chains during polymerization, may be substituted for hexadecane to reduce the level of non-polymeric organics in the polymerized product. $\alpha,\omega$-Tetradecadiene may be used similarly while simultaneously increasing the molecular weight of growing chains by crosslinking. Miniemulsion droplets, and the polymeric particles formed therefrom, may be stabilized using surfactants. The droplets and polymeric particles may, furthermore, be stabilized by incorporation of $\omega$-polar functional $\alpha$-alkenes, as polymerized units, as disclosed in: *Macromolecules* 2002, 35, 1513-1523 for alcohols and carboxylic acids; Macromolecules 2002, 35, 3342-3347 for carboxylic acids; and *Emulsion Polymerization and Emulsion Polymers*, Lovell, P. A., El-Aasser, M. S., Eds.; Wiley: Chichester; 1997. Particles of crystalline polyolefins, such as polyethylene, tend to have irregular shapes and rough surfaces. Plural particles of crystalline polyolefins are, further, prone to broad and uncontrollable particle size distribution, and instability of emulsions, and suspensions. The degree of crystallinity may be reduced through incorporation of $\alpha$-olefins, as polymerized units, into the polyolefin polymer chains, as disclosed in *Macromolecules* 2002, 35, 1513-1523. Water miscible alcohols, diols, and ketones have been used to improve the transport of monomers having low water solubility through the aqueous phase, as disclosed in US patent publication no. US20040097672. The use of carbon disulfide, xanthic acid, and phenyl isothiocyanate to enhance polymerization yields is disclosed in: U.S. Pat. No. 4,429,085, U.S. Pat. No. 4,902,741, and U.S. Pat. No. 5,986,026; and J. Polymer Science: Part A: Polymer *Chemistry* 2000, 38, 1083-1089. Alcohols, ketones, nitriles, aldehydes, and amides have been used to control the melting point of 1,2-polybutadiene, as disclosed in U.S. Pat. No. 4,429,085. Inorganic salts have further been used to enhance the efficiency of melting point regulators by decreasing the solubility of the melting point regulators in the aqueous phase, thereby driving them into the polymer containing non-aqueous phase, as disclosed in U.S. Pat. No. 5,986,026 for 1,2-polybutadiene. Reduction of volatile organic compounds has been accomplished for olefin polymerizations by substituting 1-alkenes for non-polymerizable solvents such as aromatic hydrocarbons, as disclosed in *Macromolecules* 2002, 35, 3342-3347. Substitution of a free-radical polymerizable solvent, such as styrene, for non-polymerizable solvents has also been disclosed in *Macromolecules* 2002, 35, 1513-1523. Ethylene and $\alpha$-alkenes are first polymerized in styrene as solvent, using a P,O-chelated Ni(II) complex, followed by free radical polymerization of the styrene. Many of these techniques are further useful when performed in polymerizations using larger droplet and polymer particle sizes, as typically occur for suspension polymerization.

The aqueous dispersions of addition polymers made by the method of the present invention may, for example, further contain additives such as binders, fillers, defoamers, cross-linkers, catalysts, surfactants, stabilizers, anti-flocculants, tackifiers, coalescents, colorants, waxes, and pigments.

Some embodiments of the invention will now be described in detail in the following Examples. Chemicals used in the Examples are listed in Tables A and B.

Nuclear Magnetic Resonance (NMR) Spectroscopy. NMR spectra are recorded on Varian 600, Bruker DMX-400 or DRX-500 spectrometers at 23° C. unless otherwise indicated. $^{1}H$ and $^{13}C$ chemical shifts are reported vs. $SiMe_4$ and are determined by reference to residual $^{1}H$ and $^{13}C$ solvent signals.

Molecular Weight Determination using Gel Permeation Chromatography (GPC). Gel Permeation Chromatography, otherwise known as size exclusion chromatography (SEC), actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

All samples are prepared at concentration 2 mg/mL in THF or chloroform (HPLC grade) and gently stirred to dissolve the polymer sample completely. All polymer solutions are filtered using 1 μm PTFE filter. GPC separations are performed using 2 PL gel Mixed B columns and evaporative light scattering detector (ELSD). Typical chromatographic conditions: 2 PL gel MIXED B columns, particle size 5 μm; eluent: THF or CHCl3 (HPLC grade), 1.0 ml/min; injected volume of sample solution: 50 μL; PS standards with molecular weight ranging from 580 to 2 560 000 g/mol (0.5 mg/mL in THF or CHCl3) are used to construct calibration curve; ELS detection, (TN=40° C., TECH=80° C., Fnitrogen=1 L/min).

Liquid Chromatography—NMR. Typical LC-NMR experiment conditions: a sample is dissolved in $CDCl_3$ to form a solution (ca. 1%) and filtered through a 0.2 micron filter. The polymer separation is carried out on a SUPLECOSIL reverse-phase C-18 column (25 cm×4.6 mm), with a flow rate of 1 ml/min. The Evaporative Light Scattering detection (ELSD) and UV detectors are employed with a solvent gradient of acetonitrile/water/THF from 95/5/0 to 0/0/100 in 24 minutes. LC-$^{1}$HNMR spectra are acquired on a Varian UNITY INOVA 600 MHz NMR spectrometer.

Differential Scanning Calorimetry (DSC): Modulated Differential Scanning Calorimetry measurements are carried out on a Q-1000 Series DSC made by TA Instruments. Samples are run under an inert atmosphere of nitrogen at a flow rate of 25 mL/min. Samples are heated from −90° C. to +380° C. at a rate of 7° C./min with a modulation amplitude of 1° C. and a period of 40 s.

Viscosity Determination. Brookfield viscometer fitted with a no. 3 spindle spinning at 30 RPM is utilized to measure the viscosities of liquid samples at 25° C.

Particle Size Determination using a Brookhaven BI-90 Particle Sizer. The BI-90 Nano-Sizer is a photon correlation spectroscopic device used to determine the average particle size for aqueous dispersions containing plural particles of protected catalytic composition in the range 30 nm to 1000 nm. To measure the particle size a sample of 0.1 to 0.2 grams of as is aqueous dispersion is diluted to a total of 40 cc with distilled water. A 2 cc portion is delivered into an acrylic cell which is then capped. The particle size is measured for 1000 cycles. The measurement is repeated three times and the average of three values is reported in nanometers.

Particle Size Determination for average sizes of greater 1 micron to 40 microns using the Chemical Process Specialists Disc Centrifuge Photosedimentation (DCP) unit. The DCP measures particle size distribution using centrifugal sedimentation of the particles within an optically clear spinning disc that is filled with fluid. Sedimentation is stabilized by a density gradient within the fluid and accuracy of measured sizes is insured through the use of a calibration standard having known PD and PSD before each analysis. Fluids of various densities are prepared by dissolving sucrose and an anionic surfactant in deionized water. Nine of these gradient fluids (1.5 ml each) are prepared at sucrose weight percents, based on total solution, of 0 to 8, in increments of 1 weight percent. The gradient fluids are then injected into the rotating disc, beginning with the most concentrated sucrose solution, followed by the next highest concentration, and continuing in this way until the gradient fluid containing no sucrose has been added. Each day, a calibration standard is measured as a check on the system. A 600 nm polystyrene standard (available from Duke Scientific) is run before each sample analysis. Larger or smaller standards may also be run, particularly when the sample particle size differs greatly from 600 nm.

Each aqueous dispersion of polymeric particles is diluted with a sample dilution fluid prior to analysis. The sample dilution fluid is 8% ethanol in deionized water plus anionic surfactant. The diluted standard is prepared by adding 2 drops of 600 nm standard to 10 cc of the sample dilution fluid. The diluted standard is shaken for 10-20 seconds and then a 1 cc aliquot is injected into the rotating disc. The diluted sample is similarly prepared by adding 3-5 drops (depending on the % total solids) to 10 cc of the sample dilution fluid. The diluted sample is shaken for 10-20 seconds and checked visually to assure that the particles are completely dispersed, and then a 1 cc aliquot is injected into the rotating disc. If necessary, the diluted sample can be sonicated to be sure it is completely dispersed. No filtering of the sample is necessary before injecting into the disc.

The concentration of particles at each size is determined by continuously measuring the turbidity of fluid near the outside edge of the rotating discs. The turbidity measurements are converted to a weight distribution using well known Mie Theory light scattering calculations. The weight distribution is converted to a surface area or number distribution if required.

Particle Size Determination for Average Particles Sizes Greater than 40 Microns to 560 Microns. Laser Diffraction (Malvern 2600c)-available from Separations Technology, BIO 1 μm to 560 μm, in three separate ranges, is used to determine average particle sizes and particle size distributions for aqueous dispersions of plural particles of protected catalytic compositions in the range greater than 40 microns to 560 microns.

Equipment: Pressure Reactor Configuration. A 2-liter, 316 stainless steel pressure reactor is equipped with: a magnetic drive agitator; a thermocouple well and thermocouple; a pressure relief valve; an addition funnel port; a cooling/heating jacket; a bottom discharge valve; and ports for dry nitrogen, vacuum, gas addition, vent line, and materials addition.

Equipment: Addition Funnel Configuration. A 100 ml, 316 stainless steel addition funnel is equipped with a jacket for cooling and heating, and a bottom take-off valve connected to the addition funnel port of the pressure reactor; a nitrogen port; a vacuum port; an ultrasonicator port (ball valve at top-center); a general purpose port; and a gas addition port.

Equipment: Ultrasonication Equipment. Ultrasonication is accomplished using a sonicator, model number XL2020, manufactured by Misonix company. The sonicator operates at 20 kHz and has a power dial ranging from 0 to 10 (0 to 100%).

TABLE A

| Abbreviations and descriptors of chemicals used in the preparations of the examples. | |
|---|---|
| Abbreviation or other descriptor | Chemical name and description |
| Anionic Surfactant | Ethoxylated C6 to C18 alkyl ether sulfate having 1 to 40 ethylene oxide groups per molecule (30% active in water) |
| ACRYSOL ™ RM-6 | hydrophobically modified alkali soluble thickener |
| BA | Butyl acrylate |
| LA | Lauryl acrylate |
| EA | Ethyl acrylate |
| LMA | Lauryl methacrylate |
| Sty. | Styrene |
| EHA | 2-Ethylhexyl acrylate |
| MAA | Methacrylic acid |
| nDDM | Dodecyl mercaptan |
| Me-β-CD | Methyl-beta-cyclodextran (50.8% active in water) |
| Polymer Seed Latex | Acrylic latex polymer with particle size ~40 nm and total solids 45% |
| Co(II)-MePhBF | Cobalt(II)-bis-(dimethylbenzildioxime-diborondifluoride) |
| Lupersol 11 | t-butyl peroxypivalate |
| BDbBA | p(Bd)-b-p(BA): 200/200; compatibilizer is a block copolymer of poly(butadiene) and poly(butyl acrylate) where each block has an average number of polymerized units equal to 200. |
| MPSMPP | di(2-methoxyphenyl)phosphinobenzene-2-sulfonato methyl pyridino palladium complex |

TABLE B

| Chemicals used in the preparations of the examples. | | |
|---|---|---|
| Chemical (purity) | Source | CAS # |
| Allylpalladium chloride dimer (99%) | Strem, Newburyport, MA 01950-4098 | 12012-95-2 |
| Dichloromethane (99+%), $CH_2Cl_2$ | Aldrich | 75-09-2 |
| Lithium tetrakis(pentafluorophenyl)borate etherate | Boulder Scientific, Boulder, CO BSC-353 | |
| Q-5 oxygen scavenger | Engelhard, Iselin, NJ 08830 | |
| Silver hexafluoroantimonate (98%) | Aldrich | 12005-82-2 |
| Silver hexafluorophosphate (99.99%) | Aldrich; Acros Organics, Belgium | 26042-63-7 |
| Sodium tetrakis[3,5-bis(trifluoromethyl)phenyl]borate (98+) | Aldrich | 79060-88-1 |
| p-Toluenesulfonic acid monohydrate (98%) | Aldrich | 55415-4 |
| Tricyclohexylphosphine (97%) | Strem | 2622-14-2 |
| Ethylene | | |
| Triphenylphosphine | Acros | |
| Tetrachloro-1,4-benzoquinone (99%) | Aldrich | 118-75-2 |
| Bis(1,5-cyclooctadiene) nickel (98%) | Strem | 1295-35-8 |

General Procedure for Preparing an Emulsified Monomer Mix (EMM). A 3-necked 1-liter round-bottomed flask is fitted with a nitrogen inlet tube, an agitator, and a dip-tube fitting. A nitrogen sweep is begun, and deionized water (150 g) and sodium dodecyl sulfate (SDDS) (100%, 4.5 g) are charged to the flask. The agitator is turned on at a medium rate (100 rpm) for 5 minutes to dissolve the SDDS. The agitator is turned off, and the monomer(s) (450 g) are added. The agitator is then turned on a 100 rpm for one minute. The agitator is turned off for five minutes, and then turned on again at 50 rpm. Agitation is continued as the EMM is pumped into the pressure reactor. The examples that follow all utilize the same weight ratios used in this general procedure (i.e., water/monomer(s):25/75; monomer/SDDS:100/1). The absolute amounts and flask sizes may, however, vary. Alternatively, the amount of EMM used in a given example may be removed as an aliquot from a larger batch of EMM.

EXAMPLE 1

Preparation of fully saturated protective substances by emulsion polymerization. The reactants and other ingredients for Examples 1.a-1.j can be found in Table A supra. The emulsion polymerization in this example was carried out in a 4-liter round bottom flask, having four necks, equipped with a mechanical stirrer, temperature control device, condenser, monomer and initiator feed lines and a nitrogen inlet. Deionized water (200 g), anionic surfactant (18.8 g) and Me-β-CD (59.2 g) were introduced into the reaction flask at room temperature. The contents were heated to 85° C. while stirring under nitrogen purge. An emulsified monomer mix of deionized water, anionic surfactant and monomers was prepared in accordance with Table 1.A (all units of weight are expressed in grams).

TABLE 1.A

Components of monomer mixes used to prepare protective substances 1.a–1.j.

| EMM[a] | $H_2O$ | Surf. | BA | EA | LA | Sty. | LMA | EHA | MAA | nDDM |
|---|---|---|---|---|---|---|---|---|---|---|
| 1.m.a. | 625 | 14.1 | 1500 | — | — | — | — | — | — | 30 |
| 1.m.b. | 625 | 14.1 | 1500 | — | — | — | — | — | — | 165 |
| 1.m.c. | 625 | 14.1 | 1500 | — | — | — | — | — | — | 300 |
| 1.m.d. | 625 | 14.1 | — | — | — | — | — | 1500 | — | 300 |
| 1m.e. | 625 | 14.1 | 1275 | — | — | 225 | — | — | — | 300 |

TABLE 1.A-continued

Components of monomer mixes used to prepare protective substances 1.a–1.j.

| EMM[a] | $H_2O$ | Surf. | BA | EA | LA | Sty. | LMA | EHA | MAA | nDDM |
|---|---|---|---|---|---|---|---|---|---|---|
| 1.m.f. | 625 | 14.1 | 1275 | — | — | 210 | — | — | 15 | 300 |
| 1.m.g | 625 | 14.1 | 1200 | — | — | 225 | — | — | 75 | 300 |
| 1.m.h | 625 | 14.1 | 1050 | — | 450 | — | — | — | — | 300 |
| 1.m.i | 625 | 14.1 | — | 750 | 750 | — | — | — | — | 300 |
| 1.m.j. | 625 | 14.1 | 1050 | — | — | — | 450 | — | — | 300 |

[a]Emulsified monomer mix.

At 85° C., an ammonium persulfate solution (5 g in 25 g of water) was introduced into the reaction kettle. After a 2 minute hold, a polymer seed latex (137.6 g) was slowly added over 5 minutes. At 85° C., the emulsified monomer mix was next fed to the reaction kettle over a period of 100 minutes. An initiator (1 g of ammonium persulfate in 100 g of water) solution was co-fed with the monomer emulsion. After completion of the emulsified monomer mix feed, the reaction mixture was held at 85° C. for 20 minutes. The protective substance was isolated from the polymer emulsion by stripping of the water using a rotary evaporator. The slightly hazy liquid was filtered through zeolite to obtain a clear liquid. The protective substances were characterized by conventional analytical techniques to determine molecular weight and viscosity. Molecular weights were measured by GPC (SEC) using a polystyrene standard from Polymer Laboratories (PS-1) having a peak average molecular weight ranging from 580 to 7,500,000. Mark-Houwink constants were applied for the conversion. Viscosity was measured by a Brookfield Viscometer.

TABLE 1.B

Characteristics of saturated protective substances produced in Example 1

| Protective Substance | Composition, parts by weight | Mw | Mn | Viscosity, centipoise | Tg, ° C. | Polymerization Type |
|---|---|---|---|---|---|---|
| 1.a | BA/nDDM: 100/2 | 23072 | 14530 | >100,000 | −71.1 | emulsion |
| 1.b | BA//nDDM: 100//11 | 3290 | 2223 | | −67.4 | emulsion |
| 1.c | BA//nDDM: 100/20 | 2303 | 1730 | 450 | −76.3 | emulsion |
| 1.d | EHA//nDDM: 100/20 | 2133 | 1682 | 310 | <−85 | emulsion |
| 1.e | BA/Sty//nDDM: 85/15//20 | 2609 | 1666 | | −69 | emulsion |
| 1.f | BA/Sty/MAA//nDDM: 85/14/1//20 | 2395 | 1709 | | −68 | emulsion |
| 1.g | BA/Sty/MAA//nDDM: 80/15/5//20 | 2388 | 1714 | 5950 | −64.9 | emulsion |
| 1.h | BA/LA//nDDM: 70/30/20 | 2449 | 1842 | 260 | −52.2 | emulsion |
| 1.i | EA/LA//nDDM: 50/50/20 | 2646 | 1958 | 430 | −19.7 | emulsion |
| 1.j | BA/LMA//nDDM: 70/30//20 | 2494 | 1874 | 370 | −33.6 | Emulsion |

EXAMPLE 2.A

Preparation of fully saturated protective substances by solution polymerization in toluene solvent. The solution polymerization in this example was carried out in a 1-liter round bottom flask, having four necks, equipped with a mechanical stirrer, temperature control device, condenser, monomer and initiator feed lines and a nitrogen inlet. Toluene (185 g) and BA (16.8 g) were introduced into the reaction flask at room temperature. The contents were heated to 65° C. while stirring under nitrogen purge. At 65° C., a solution of 0.24 g of Lupersol 11 in 14 g of toluene was introduced into the reaction flask. A monomer mixture containing 135 g of BA and 15 g of nDDM was fed over a period of 45 minutes. After the feed, the reaction mixture was held at 65° C. for 15 minutes. The contents were heated to 80° C., and a solution of 0.24 g of Lupersol 11 in 10 g of toluene was added. The reaction mixture was held at 80° C. for an hour. The protective substance (1.d) was isolated by evaporation of the solvent using a rotary evaporator. The protective substance 2.a (BA//nDDM: 100//20) had the following characteristics: $M_w$=2258; $M_n$=2298; viscosity=240 centipoise; and Tg<−78° C.

EXAMPLE 2.B

Preparation of fully saturated protective substances by solution polymerization in isopropanol solvent. The solution polymerization was carried out in a 3-liter round bottom flask, having four necks, equipped with a mechanical stirrer, temperature control device, condenser, monomer and initiator feed lines and a nitrogen inlet. Isopropanol (IPA, 600 g) was introduced into the reaction flask at room temperature, and heated to 82° C. under nitrogen sweep. A monomer mixture containing BA (1800 g) and isopropanol (180 g) was prepared separately. The monomer mixture was fed into the reaction flask over 120 minutes together with an initiator solution containing Trigonox™ 125-C75 (72 g) in isopropanol (300 g). The reaction mixture was held at 85° C. for 30 minutes at the end of the feed and an initiator solution containing Trigonox™ 125-C75 (18 g) in isopropanol (168 g) was added. After 30 minutes at 85° C., another initiator solution containing Trigonox™ 125-C75 (18 g) in isopropanol (168 g) was added. The reaction mixture was held at 85° C. for 90 minutes and then cooled to room temperature. The protective substance 2.b was isolated as a clear viscous oil by stripping of the isopropanol using a rotary evaporator. Protective substance 2.b.1 had the following characteristics: $M_w$=5556; $M_n$=4190; and Tg<−78° C. The weight ratio of BA to isopropoxy end groups is 100/1.4, as calculated based upon $M_n$ and one isopropoxy group per chain. Characteristics of protective substances 2.b.1-13 made by this method are given in Table 2.B.

TABLE 2.B

Characteristics of saturated protective substances produced in Example 2.B

| Protective Substance | Composition, parts by weight | Initiator Level used in preparation | Mw | Mn | Tg, ° C. | Comment |
|---|---|---|---|---|---|---|
| 2.b.1 | BA: 100 | 4%(1) | 5,556 | 4,190 | <−78 | |
| 2.b.2 | BA/MMA/AA: 45/45/10 | 4%(1) | 41,584 | 30,812 | 23.4 | |
| 2.b.3 | BA/LA: 70/30 | 1%(1) | 12,079 | 8,323 | | |
| 2.b.4 | BA/MMA: 70/30 | 4%(1) | 11,136 | 6,973 | −20.2 | |
| 2.b.5 | BA/LA: 70/30 | 1%(1) | 9,636 | 5,177 | | |
| 2.b.6 | BA: 100 | 10.5%(2) | 9,368 | 6,106 | −53.1 | |
| 2.b.7 | BA: 100 | 10.5%(2) | 8,674 | 5,693 | −53 | |
| 2.b.8 | BA/LA: 70/30 | 4%(1) | 7,610 | 3,576 | | |
| 2.b.9 | BA/AA: 90/10 | 4%(1) | 5,940 | 3,970 | | |
| 2.b.10 | BA/AA: 80/20 | 4%(1) | 5,800 | 3,940 | | |
| 2.b.11 | BA/LA: 70/30 | 4%(1) | 5,469 | 3,941 | −60 | |
| 2.b.12 | BA/LA: 70/30 | 8%(1) | 3,860 | 2,385 | | |
| 2.b.13 | BA/LA: 70/30 | 4%(1) | 2,950 | 1,958 | | 20% solids(3) |

(1)Trigonox 125-C75 (Akzo Nobel) 75% active (2)VASO-67 (DuPont) 100% active (3)The polymerization was carried out with excess IPA in the reaction flask.

General procedures. The organometallic catalyst components of Examples 3 and 4 are prepared in a glove box. Nitrogen is purified by passage through columns containing activated molecular sieves and Q-5 oxygen scavenger. Toluene is purified by passage through columns of activated molecular sieves (4 Å)/alumina/O2 remover (e.g., Q-5) and methylene chloride is purified by passage through columns of activated alumina. Methanol is purified by passage through a column of activated molecular sieves (4 Å) and purged with nitrogen for 0.5 hour. Lithium tetrakis(pentafluorophenyl) borate etherate is purchased from Boulder Scientific; allylpalladium chloride dimer (99%) and tricyclohexylphosphine (97%) are purchased from Strem; silver hexafluorophosphate (98%) is purchased from Acros; and all are used without further purification.

Methyl acrylate (99%) is purchased from Aldrich and purified by passage through columns of MEHQ inhibitor remover and activated molecular sieves (4 Å), and purged with nitrogen for 0.5 hour. Norbomene (99%) is purchased from Acros and purified using the following method: It is dissolved in a small amount of toluene to yield a clear colorless solution, which is passed through a column of activated molecular sieves (4 Å) and alumina and purged with nitrogen for 0.5 hour. The concentration of this toluene solution of norbornene is determined by $^1H$ NMR analysis.

EXAMPLE 3

Preparation of an organometallic catalyst component. To a 100 mL serum bottle under $N_2$ is added triphenylphosphine (390 mg, 1.50 mmol) and tetrachloro-1,4-benzoquinone (370 mg, 1.50 mmol), 10 mL methanol and 50 mL toluene. After stirring for 30 minutes (magnetic stirrer), this solution is added to another 100 mL serum bottle under $N_2$ containing bis(1,5-cyclooctadiene) nickel (45 mg, 165 μmol). The solution is stirred (magnetic stirrer) for 30 minutes, and then solvent is removed by evaporation (35° C. at reduced pressure) until there is a total volume of 40 mL of solution.

EXAMPLE 4

Preparation of an organometallic catalyst component. A 250 mL flask is charged with allylpalladium chloride dimer (643 mg, 1.74 mmol) and lithium tetrakis(pentafluorophenyl) borate etherate (2.908 g, 3.48 mmol). $CH_2Cl_2$ (pre-cooled at −35° C., 134 mL) is added, and the mixture is gently swirled to form a pale yellow slurry. A solution of tricyclohexylphosphine (978 mg in 67 mL $CH_2Cl_2$; 14.6 mg/mL) is added to form a pale yellow slurry. The slurry is held for 0.5 hour, then the total volume of the slurry is reduced to 40 mL by evaporation (nitrogen sweep at 35° C.; pressure=90 kPa).

EXAMPLE 5

Preparation of protected catalytic compositions and their use in preparing ethylene copolymers. The general equipment described supra is used in the reactions of Example 5. The pressure reactor and addition funnel are placed under a blanket of dry nitrogen. The bottom valve of the addition funnel is closed, and all other valves to the pressure reactor are closed. Water at 35° C. is circulated through the jackets of the addition funnel and the pressure reactor, and vacuum is applied until the pressure is reduced to 10 kPa in each of the pressure reactor and the addition funnel. After holding at 10 kPa for 10 minutes, dry nitrogen is introduced to increase the pressure in the addition funnel and the pressure reactor to 101 kPa. The evacuation cycle is repeated twice more, for a total of three cycles. While maintaining a nitrogen sweep on the pressure reactor and the addition funnel, the general purpose port of the addition funnel is opened and protective substance sample 1.h (20 g) is added (in Example 5 processes utilizing a compatibilizer, that compatibilizer, BDbBA (dry) is added along with the protective substance, see Table 5), followed immediately by addition of the Example 3 solution of organometallic catalyst component in toluene (40 mL) using a syringe. The ultrasonicator port is closed and pressure is slowly decreased to 10 kPA during 1 hour at 50° C. to remove the toluene and assure dissolution of the organometallic catalyst component in the protective substance to form a protected catalytic composition. The pressure is then returned to 101 kPa. The viscosity of the protected catalytic composition at 25° C. should be 260 centipoise.

The pressure reactor is charged with 400 ml of deionized water and partially methylated β-cyclodextrin (4.0 g), agitation is begun, and the pressure in the pressure reactor is decreased to 90 kPa. Cooling water (10° C.) is applied to the jacket of the addition funnel, and a solution of 0.2 g of SDDS (100%) in 50 g of deionized water is added by syringe through the ultrasonicator port. Similarly, a solution of thickener ACRYSOL™ RM-6 (1.0 g in 10 g of deionized water; neutralized) is added by syringe through the ultrasonicator port. The ultrasonicator is immediately inserted into the ultrasonicator port, and its probe tip is positioned 1 cm from the bottom of the addition funnel. The ultrasonicator is turned on for one minute to form the protected catalytic dispersion, and then removed from the ultrasonicator port, the valve of which is immediately closed. The average diameter of the droplets of protected catalytic composition in the protected catalytic dispersion should be 200 nm. The bottom valve of the addition funnel is then opened slowly, allowing the lower pressure in the pressure reactor to draw the protected catalytic dispersion into the pressure reactor to give a diluted protected catalytic dispersion containing 4.25 weight % protected catalytic composition. The bottom valve of the addition funnel is closed, and the reactor is pressurized to 2500 kPa with ethylene fed from an ethylene cylinder placed on a load cell. A constant gradual feed (using a high pressure pump) of emulsified monomer mix (1-hexene/5-hexenoic acid/water/SDDS:20 g/0 g/6.7 g/0.2 g) is started immediately and maintained at a constant rate of 6.725 g/hr for 4.0 hours. (Other Example 5 reactions have the monomer ratios given in Table 5, along with other process and product variables and characteristics.) Elevation of the temperature of the polymerization mixture to 70° C. is also started immediately, and 70° C. is reached within 0.5 hour. The pressure of 2500 kPa is maintained as the ethylene polymerizes. When a total of 180 grams of ethylene have been fed to the reactor (4.0 hour ethylene total feed time), the ethylene feed valve is turned off and the pressure is allowed to drop to 1500 kPa. The pressure is then vented and the reactor is cooled to 25° C. while maintaining a nitrogen sweep. The final aqueous polymer dispersion is freeze dried to yield dry polymer. The yield should be 200 g of polymer containing 90 weight % polyethylene copolymer and 10 wt % protective substance (ethylene and 1-hexene conversion to polymer should be 90%). Characteristics of the Example 5 reactions, dispersions, and additions polymers formed are given in Table 5.

the toluene, a 1-liter cylinder containing 2,2-dimethylpropane is placed on a load cell, and connected, through a flexible pressure tube to the gas addition port of the addition funnel. The 2,2-dimethylypropane is fed into the chilled addition funnel at a rate of approximately 2 g/min. After 17.5 g of 2,2-dimethylpropane have been collected in the addition funnel (measured as weight loss from the 2,2-dimethylpropane cylinder), the valve at the gas addition port is turned off, and the temperature of the cooling brine is adjusted to −2° C. A chilled (5° C.) solution of 0.5 g of SDDS in 50 g of deionized water is charged through the general purpose port. Similarly, a solution of thickener ACRYSOL™ RM-6 (1.0 g in 10 g of deionized water; neutralized) is charged through the general purpose port. With the nitrogen port open to apply a slight nitrogen sweep, the ultrasonicator is immediately inserted into the ultrasonicator port, and its probe tip is positioned 1 cm from the bottom of the addition funnel. The ultrasonicator is turned on for 1 minute to form an protected catalytic dispersion in which the average diameter and viscosity of the droplets of protected catalytic composition should be 100 nm and 10 centipoise, respectively. The ultrasonicator is removed and the ultrasonicator port ball valve is closed.

While the protected catalytic dispersion is being prepared in the addition funnel, the pressure reactor is charged with deionized water (1,000 ml) and partially methylated β-cyclodextrin (10.0 g) agitation is begun, and the pressure in the pressure reactor is decreased to 90 kPa. Brine (−10° C.) is circulated through the jacket of the pressure reactor at a rate sufficient to cool the water to 3° C. Immediately after preparation of the protected catalytic dispersion in the addition funnel is complete, the bottom valve of the addition funnel is opened slowly, allowing the lower pressure in the pressure reactor to draw the protected catalytic dispersion into the pressure reactor to give a diluted protected catalytic dispersion containing droplets that should have an average droplet diameter of 100 nm. The bottom valve of the addition funnel is closed, the nitrogen valve on the pressure reactor is opened

TABLE 5

Example 5 preparation variables, characteristics and product addition polymer characteristics.

| final polymer sample no. | 5.a | 5.b | 5.c | 5.d | 5.e | 5.f | 5.g | 5.h[(b)] |
|---|---|---|---|---|---|---|---|---|
| protective substance sample no. | 2.b.13 | 2.b.13 | 2.b.13 | 2.b.11 | 2.b.6 | 2.b.6 | 2.b.6 | 2.b.6 |
| protective substance weight, g | 20 | 20 | 20 | 20 | 20 | 20 | 20 | 20 |
| Example 3 organometallic catalyst component soln., mL | 40 | 40 | 40 | 40 | 40 | 40 | 40 | 40 |
| compatibilizer BDpBA amount, g | — | — | 4 | 4 | — | — | 4 | 4 |
| protected catalytic dispersion ave. droplet diam.[a], nm (no fugitive subs.)a | 40 | 40 | 40 | 100 | 250 | 250 | 250 | 250 |
| Me-β-CD, g (active) | 4 | 4 | 4 | 4 | 4 | 4 | 4 | 4 |
| weight of ethylene fed to the pressure reactor[a], g | 180 | 178 | 180 | 180 | 180 | 178 | 180 | 180 |
| weight of 1-hexene fed to the pressure reactor[a], g | 20 | 20 | 20 | 20 | 20 | 20 | 20 | 20 |
| weight of 5-hexenoic acid fed to the pressure reactor[a], g | — | 2 | — | — | — | 2 | — | — |
| % of total monomers converted to polymer[a], weight % | 90 | 90 | 90 | 90 | 90 | 90 | 90 | 90 |
| average particle diam. for final polymer dispersion[a], nm | 86 | 86 | 82 | 204 | 538 | 538 | 538 | 538 |
| total polymer in final dispersion, based on final dispersion[a], wt % | 30.5 | 30.5 | 30.9 | 30.9 | 30.5 | 30.5 | 30.9 | 30.9 |
| polyethylene in final dry polymer[a], weight % | 90 | 90 | 88 | 88 | 90 | 90 | 88 | 88 |
| Mn of copolymer ($\times 10^3$) | 11 | 11 | 11 | 11 | 11 | 11 | 11 | 11 |
| Mw of copolymer ($\times 10^3$) | 6 | 6 | 6 | 6 | 6 | 6 | 6 | 6 |
| Mw/Mn of copolymer ($\times 10^3$) | 1.8 | 1.8 | 1.8 | 1.8 | 1.8 | 1.8 | 1.8 | 1.8 |

[a]These are values that should be observed by analytical techniques.

[b]5.h polymerization conditions and reaction amounts are the same as for 5.g, except that the organometallic catalyst component is di(2-methoxyphenyl)phosphinobenzene-2-sulfonato methyl pyridino palladium complex (MPSMPP).

EXAMPLE(S) 6

Preparation of protected catalytic compositions containing fugitive substances and their use in preparing ethylene copolymers. The equipment and evacuation cycle (vacuum/nitrogen) are the same as in Example 5. After evaporation of to provide a nitrogen sweep in the reactor, and the valve to the vent line is opened to allow escape of the 2,2-dimethylpropane into a vent line which is fitted with a liquid nitrogen trap. The temperature of the diluted protected catalytic dispersion is slowly increased (0.5° C./min) to 15° C. to produce a diluted protected catalytic dispersion, from which 2,2-dimethylpropane has been removed, which has droplets of protected catalytic composition that should have an average droplet diameter of 50 nm.

The reactor is pressurized to 2500 kPa with ethylene fed from an ethylene cylinder placed on a load cell. A constant gradual feed (using a high pressure pump) of emulsified monomer mix (1-hexene/5-hexenoic acid/water/SDDS:50 g/0 g/16.7 g/0.5 g) is started immediately and maintained at a constant rate of 16.8 g/hr for 4.0 hours. (Other Example 6 reactions have the monomer ratios given in Table 6, along with other process and product variables and characteristics.) Elevation of the temperature of the polymerization mixture to 70° C. is also started immediately, and 70° C. is reached within 0.5 hour. The pressure of 2500 kPa is maintained as the ethylene polymerizes. When a total of 500 grams of ethylene have been fed to the reactor (6.0 hour ethylene total feed time), the ethylene feed valve is turned off and the pressure is allowed to drop to 1500 kPa. The pressure is then vented and the reactor is cooled to 25° C. while maintaining a nitrogen sweep. The final aqueous polymer dispersion is freeze dried to yield dry polymer. The yield should be 502 g of polymer containing 99.5 weight % polyethylene copolymer and 0.5 wt % protective substance (ethylene and 1-hexene conversion to polyethylene=90%). Characteristics of the Example 6 reactions and additions polymers formed are given in Table 6.

TABLE 6

Example 6 preparation variables, characteristics and product addition polymer characteristics.

| final polymer sample no. | 6.a | 6.b | 6.c | 6.d | 6.e | 6.f |
|---|---|---|---|---|---|---|
| protective substance sample no. | 2.b.4 | 2.b.4 | 2.b.3 | 2.b.3 | 2.b.2 | 2.b.2 |
| protective substance weight, g | 2.6 | 2.6 | 2.6 | 2.6 | 2.6 | 2.6 |
| 2,2-dimethylpropane (fugitive substance) weight, g | 17.5 | 17.5 | 17.5 | 17.5 | 17.5 | 17.5 |
| Example 3 organometallic catalyst component soln., mL | 40 | 40 | 40 | 40 | 40 | 40 |
| compatibilizer BDpBA amount, g | — | — | 4 | 4 | — | — |
| protected catalytic dispersion ave. droplet diam.[a], nm (with fugitive subs.)a | 60 | 60 | 80 | 80 | 200 | 200 |
| Me-β-CD, g (active) | 10 | 10 | 10 | 10 | 10 | 10 |
| protected catalytic dispersion ave. droplet diam.[a], nm (no fugitive subs.)a | 30 | 30 | 52 | 52 | 101 | 101 |
| weight of ethylene fed to the pressure reactor[a], g | 450 | 445 | 450 | 445 | 450 | 445 |
| weight of 1-hexene fed to the pressure reactor[a], g | 50 | 50 | 50 | 50 | 50 | 50 |
| weight of 5-hexenoic acid fed to the pressure reactor[a], g | — | 5 | — | 5 | — | 5 |
| % of total monomers converted to polymer[a], weight % | 90 | 90 | 90 | 90 | 90 | 90 |
| average particle diam. for final polymer dispersion[a], nm | 169 | 169 | 213 | 213 | 565 | 565 |
| total polymer in final dispersion, based on final dispersion[a], wt % | 30 | 30 | 30 | 30 | 30 | 30 |
| polyethylene copolymer in final dry polymer[a], weight % | 99.4 | 99.4 | 98.6 | 98.6 | 99.4 | 99.4 |
| Mn of copolymer ($\times 10^3$) | 11 | 11 | 11 | 11 | 11 | 11 |
| Mw of copolymer ($\times 10^3$) | 6 | 6 | 6 | 6 | 6 | 6 |
| Mw/Mn of copolymer ($\times 10^3$) | 1.8 | 1.8 | 1.8 | 1.8 | 1.8 | 1.8 |

[a]These are values that should be observed by analytical techniques.

EXAMPLE 7

Preparation of protected catalytic compositions and their use in preparing norbornene and methyl acrylate homo- and copolymers. The method of Example 5 is used in this example to the point at which the monomer is to be added (ethylene is not used in this procedure), except that the Example 3 solution of organometallic catalyst component in toluene (40 mL) is replaced by the Example 4 solution (also 40 mL). and the amount of partially methylated β-cyclodextrin varies as indicated in Table 7. The following procedure is used from that point on: The bottom valve of the addition funnel is closed, and the pressure is adjusted to 101 kPa with nitrogen. A constant gradual feed of emulsified monomer mix (norbornene/methyl acrylate/methacrylic acid/water/SDDS:100 g/100 g/0 g/67 g/2.0 g) is started immediately and maintained at a constant rate of 67.25 g/hr for 12.0 hours. (Other Example 7 reactions have the monomer ratios given in Table 7, along with other process and product variables and characteristics.) Elevation of the temperature of the polymerization mixture to 60° C. is also started immediately, and 60° C. is reached within 0.5 hour. At completion of the feed, the temperature of 60° C. is maintained for an additional hour. The final polymer dispersion is then cooled to 25° C. The final aqueous polymer dispersion is freeze dried to yield dry polymer. The yield should be 180 g of polymer containing 89 weight % poly [(norbornene-co-(methyl acrylate)] and 11 wt % protective substance (conversion of monomers to copolymer=80%). Characteristics of the Example 7 reactions and additions polymers formed are given in Table 7.

TABLE 7

Example 7 preparation variables, characteristics and product addition polymer characteristics.

| final polymer sample no. | 7.a | 7.b | 7.c | 7.d | 7.e | 7.f | 7.g | 7.h |
|---|---|---|---|---|---|---|---|---|
| protective substance sample no. | 2.b.13 | 2.b.13 | 2.b.13 | 2.b.13 | 2.b.11 | 2.b.11 | 2.b.6 | 2.b.6 |
| protective substance weight, g | 20 | 20 | 20 | 20 | 20 | 20 | 20 | 20 |
| Example 4 organometallic catalyst component soln., mL | 40 | 40 | 40 | 40 | 40 | 40 | 40 | 40 |
| compatibilizer BDpBA amount, g | — | 4 | — | — | — | — | — | 4 |

TABLE 7-continued

| Example 7 preparation variables, characteristics and product addition polymer characteristics. | | | | | | | | |
|---|---|---|---|---|---|---|---|---|
| protected catalytic dispersion ave. droplet diam.[a], nm (no fugitive subs.)a | 40 | 40 | 40 | 40 | 100 | 100 | 250 | 250 |
| Me-β-CD, g (active) | — | 2 | 4 | 1 | 4 | 4 | 4 | 4 |
| weight of norbornene fed to the pressure reactor[a], g | 100 | 100 | 180 | 20 | 100 | 100 | 180 | 180 |
| weight of methyl acrylate fed to the pressure reactor[a], g | 100 | 98 | 20 | 180 | 100 | 98 | 20 | 20 |
| weight of methacrylic acid fed to the pressure reactor[a], g | — | 2 | — | — | — | 2 | — | — |
| % of total monomers converted to polymer[a], weight % | 80 | 80 | 80 | 80 | 80 | 80 | 80 | 80 |
| average particle diam. for final polymer dispersion[a], nm | 83 | 79 | 83 | 83 | 208 | 208 | 519 | 492 |
| total polymer in final dispersion, based on final dispersion[a], wt % | 25.8 | 26.3 | 25.8 | 25.8 | 25.8 | 25.8 | 25.8 | 26.3 |
| copolymer in final dry polymer[a], weight % | 88.8 | 86.9 | 88.8 | 88.8 | 88.8 | 88.8 | 88.8 | 86.9 |
| Mn of copolymer ($\times 10^3$) | 11 | 11 | 11 | 11 | 11 | 11 | 11 | 11 |
| Mw of copolymer ($\times 10^3$) | 6 | 6 | 6 | 6 | 6 | 6 | 6 | 6 |
| Mw/Mn of copolymer ($\times 10^3$) | 1.8 | 1.8 | 1.8 | 1.8 | 1.8 | 1.8 | 1.8 | 1.8 |

[a]These are values that should be observed by analytical techniques.

EXAMPLE 8

Preparation of protected catalytic compositions containing fugitive substances and their use in preparing norbornene and methyl acrylate homo- and copolymers. The method of Example 6 is used in this examples to the point at which the monomer is to be added (ethylene is not used in this procedure), except that the Example 3 solution of organometallic catalyst component in toluene (40 mL) is replaced by the Example 4 solution (also 40 mL). The following procedure is used from that point on: The bottom valve of the addition funnel is closed, and the pressure is adjusted to 101 kPa with nitrogen. A constant gradual feed of emulsified monomer mix (norbornene/methyl acrylate/5-hexanoic acid/methacrylic acid/water/SDDS:250 g/250 g/0 g/0 g/167 g/5.0 g) is started immediately and maintained at a constant rate of 67.25 g/hr for 4.0 hours. (Other Example 8 reactions have the monomer ratios given in Table 8, along with other process and product variables and characteristics.) Elevation of the temperature of the polymerization mixture to 60° C. is also started immediately, and 60° C. is reached within 0.5 hour. At completion of the feed, the temperature of 60° C. is maintained for an additional hour. The final polymer dispersion is then cooled to 25° C. The final aqueous polymer dispersion is freeze dried to yield dry polymer. The yield should be 403 g of polymer containing 99.4 weight % poly[(norbornene-co-(methyl acrylate)] and 0.6 wt % protective substance (conversion of monomers to copolymer=80%). Characteristics of the Example 8 reactions and additions polymers formed are given in Table 8.

TABLE 8

| Example 8 preparation variables characteristics and product addition polymer characteristics. | | | | | | |
|---|---|---|---|---|---|---|
| final polymer sample no. | 8.a | 8.b | 8.c | 8.d | 8.e | 8.f |
| protective substance sample no. | 2.b.4 | 2.b.4 | 2.b.3 | 2.b.3 | 2.b.2 | 2.b.2 |
| protective substance weight, g | 2.5 | 2.5 | 2.5 | 2.5 | 2.5 | 2.5 |
| 2,2-dimethylpropane (fugitive substance) weight, g | 17.5 | 17.5 | 17.5 | 17.5 | 17.5 | 17.5 |
| Example 4 organometallic catalyst component soln., mL | 40 | 40 | 40 | 40 | 40 | 40 |
| compatibilizer BDpBA amount, g | — | 4 | 4 | 4 | — | 4 |
| protected catalytic dispersion ave. droplet diam.[a], nm (with fugitive subs.)a | 60 | 60 | 80 | 80 | 200 | 200 |
| Me-β-CD, g (active) | 10 | 10 | 10 | 10 | 10 | 10 |
| protected catalytic dispersion ave. droplet diam.[a], nm (no fugitive subs.)a | 30 | 39 | 52 | 52 | 101 | 130 |
| weight of norbornene fed to the pressure reactor[a], g | 250 | 250 | 450 | 50 | 250 | 250 |
| weight of methyl acrylate fed to the pressure reactor[a], g | 250 | 245 | 50 | 450 | 250 | 245 |
| weight of methacrylic acid fed to the pressure reactor[a], g | — | 5 | — | — | — | 5 |
| weight of 5-hexenoic acid fed to the pressure reactor[a], g | — | — | — | — | — | — |
| % of total monomers converted to polymer[a], weight % | 80 | 80 | 80 | 80 | 80 | 80 |
| average particle diam. for final polymer dispersion[a], nm | 163 | 154 | 205 | 205 | 543 | 513 |
| total polymer in final dispersion, based on dispersion[a], wt % | 24.9 | 25 | 25 | 25 | 24.9 | 25 |
| copolymer in final dry polymer[a], weight % | 99.4 | 98.4 | 98.4 | 98.4 | 99.4 | 98.4 |
| Mn of copolymer ($\times 10^3$)[a] | 11 | 11 | 11 | 11 | 11 | 11 |
| Mw of copolymer ($\times 10^3$)[a] | 6 | 6 | 6 | 6 | 6 | 6 |
| Mw/Mn of copolymer ($\times 10^3$)[a] | 1.8 | 1.8 | 1.8 | 1.8 | 1.8 | 1.8 |

[a]These are values that should be observed by analytical techniques.

EXAMPLE 9

Preparation of fully saturated protective substances. The samples of Example 9 were prepared by the method of Example 1 to give protective substance have content and characteristic listed in Table 9.

TABLE 9

Characteristics of fully saturated protective substances of Example 9.

| Sample No. | Composition, parts by weight | Mw[a] | Mn[a] | Viscosity[a], centipoise | Tg[a], ° C. | Polymerization Type |
|---|---|---|---|---|---|---|
| 9.a | BA/LA//nDDM: 70/30/15 | 2300 | 1500 | | −71 | emulsion |
| 9.b | BA/LA//nDDM: 70/30/10 | 3300 | 2200 | | −71 | emulsion |
| 9.c | BA/LA//nDDM: 70/30/5 | 6300 | 4200 | | −71 | emulsion |
| 9.d | BA/LA//nDDM: 70/30/2 | 15000 | 10000 | >100,000 | −71 | emulsion |

[a]These are values that should be observed by analytical techniques.

EXAMPLE 10

Preparation by emulsion polymerization of protective substances that are macromonomers. Protective substances that are macromonomers were prepared by emulsion polymerization processes in Examples 10.a to 10.h. The polymerization was conducted in a 2-liter, four neck round bottom reaction flask equipped with a mechanical stirrer, temperature control device, condenser, monomer feed line and a nitrogen inlet according to the following procedure: The specific amounts of water, surfactant, MMA, chain transfer agent (CTA), and initiator used in Examples 10.a to 10.h are shown in Table 10. These ingredients were added according to the following procedure. In a different flask from the reaction flask, a monomer solution was prepared by dissolving the CTA [Co(II)-MePhBF] in MMA under a nitrogen purge. Deionized water and surfactant (OT-100) were introduced into the reaction flask at room temperature to form a water surfactant solution. The water surfactant solution was mixed and heated to 80° C. with stirring under a nitrogen purge. Upon reaching a temperature of 80° C., and upon complete dissolution of the surfactant, the initiator (CVA) was added to the water surfactant solution with stirring for 1 minute to permit the initiator to dissolve. After dissolution of the initiator, 20 percent by weight of the monomer solution was added to the reaction flask with stirring. Following this initial charge, the remaining monomer solution was fed over a period of 1 to 2 hours, with stirring, to form a reaction mixture. At the end of the feed period, the reaction mixture was maintained at 80° C. for an additional 3 hours. The reaction mixture was then cooled to room temperature and passed through a filter cloth to remove any coagulum.

Generally, the resulting macromonomer emulsion contained less than 5 weight percent coagulum based on the total weight of macromonomer, and the conversion of monomer was over 99 weight percent, based on the total weight of monomer added. The Mn, weight percent solids and particle size for each macromonomer are reported in Table 10.

TABLE 10

Example 10 Preparation of macromonomers: variables and macromonomer characteristics

| Example | $H_2O$ (g) | Surfactant (g)[c] | MMA (g) | LA (g) | CTA ppm[a] | Initiator (g)[b] | Part. Size (nm) | Mn | Wt % Solids |
|---|---|---|---|---|---|---|---|---|---|
| 10.a | 720 | 3.6 | 324 | — | 40 | 3.6 | 165 | 2430 | 32.0 |
| 10.b | 720 | 3.6 | 324 | — | 8.7 | 3.6 | 126 | 12612 | 31.0 |
| 10.c | 720 | 3.6 | 324 | — | 10.9 | 3.6 | 158 | 9656 | 31.0 |
| 10.d | 720 | 3.6 | 324 | — | 80.6 | 3.6 | 231 | 1386 | 30.3 |
| 10.e | 720 | 3.6 | 324 | — | 21.8 | 3.6 | 201 | 4416 | 29.1 |
| 10.f | 720 | 3.6 | 324 | — | 10.7 | 3.6 | 169 | 7931 | 30.5 |
| 10.g | 720 | 3.6 | 360 | — | 11.9 | 3.6 | 155 | 10185 | 32.0 |
| 10.h | 1440 | 7.2 | 720 | — | 15.2 | 7.2 | 167 | 7237 | 32.0 |
| 10.i[d] | 720 | 3.6 | 97.2 | 226.8 | 250 | 3.6 | 170 | 2000 | 31 |

[a]ppm moles of chain transfer agent (CoBF) based on total moles of monomer.

[b]CVA, supplied by Aldrich as a 75 weight percent aqueous solution of initiator.

[c]OT-100.

[d]samples 10.a–h were all prepared by the method of Example 10; sample 10.i would be prepared by the method of Example 10 using the variables indicated to produce a macromonomer which should have the indicated characteristics.

EXAMPLE 11

Preparation of protected catalytic compositions and their use in preparing norbornene and methyl acrylate copolymers. The method of Example 8 is used in this example. (No 5-hexenoic acid was used in any of the reactions of Example 11.) Process and product variables and characteristics are given in Table 11.

TABLE 11

| Example 11 Preparation variables, characteristics and product addition polymer characteristics. | | | |
|---|---|---|---|
| final polymer sample no. | 11.a | 11.b | 11.c |
| protective substance sample no. | 10.b | 10.d | 10.i |
| protective substance weight, g | 2.5 | 2.5 | 2.5 |
| 2,2-dimethylpropane (fugitive substance) weight, g | 17.5 | 17.5 | 17.5 |
| Example 4 organometallic catalyst component soln., mL | 40 | 40 | 40 |
| protected catalytic dispersion ave. droplet diam.[a], nm (with fugitive sub.)a | 100 | 100 | 100 |
| Me-β-CD, g (active) | 10 | 10 | 10 |
| protected catalytic dispersion ave. droplet diam.[a], nm (no fugitive subs.)a | 51 | 51 | 51 |
| weight of norbornene fed to the pressure reactor[a], g | 250 | 250 | 250 |
| weight of methyl acrylate fed to the pressure reactor[a], g | 250 | 250 | 250 |
| weight of methacrylic acid fed to the pressure reactor[a], g | 5 | 5 | 5 |
| % of total monomers converted to polymer[a], weight % | 80 | 80 | 80 |
| average particle diam. for final polymer dispersion[a], nm | 272 | 272 | 272 |
| total polymer in final dispersion, based on final dispersion[a], wt % | 25 | 25 | 25 |
| copolymer in final dry polymer[a], weight % | 99.4 | 99.4 | 99.4 |
| Mn of copolymer ($\times 10^3$) | 18 | 18 | 18 |
| Mw of copolymer ($\times 10^3$) | 7 | 7 | 7 |
| Mw/Mn of copolymer ($\times 10^3$) | 2.5 | 2.5 | 2.5 |

[a]These are values that should be observed by analytical techniques.

EXAMPLE 12

Preparation of protected catalytic compositions and their use in preparing norbornene and methyl acrylate homo- and copolymers. The method of Example 7 is used in this example, except for the following: a rotor-stator mixing device, utilizing the rpm settings and mixing times given in Table 12, is used instead of the ultrasonicator; suspending agent (0.4 g) is mixed with water, instead of SDDS, and used to form the protected catalytic dispersion before being added to the pressure reactor; and suspending agent (12 g) is added to the pressure reactor along with the initial water charge. Preparation variables and characteristics, as well as addition polymer characteristics, are given in Table 12. The final aqueous polymer dispersion is freeze dried to yield dry polymer. The yield should be 500 g of polymer containing 96 weight % norbornene/methyl acrylate copolymer (when methacrylic acid is also used, it too should be incorporated into the copolymer).

EXAMPLE 13

Preparation of protective substances that are macromonomers. An aqueous dispersion of a cobalt catalytic chain transfer catalyst in the protective substance was used as a seed in the emulsion polymerization of methyl methacrylate. The dispersion was prepared by dissolving 0.003 g of Co(II)-MePhBF in 3 g of the protective substance, sample 1.c. The protective substance was added to 4.5 g of water and 0.3 g of Tergital 15-S-5 and the mixture was emulsified by using a homogenizer. A monomer emulsion of methyl methacrylate (16 g), water (8 g) and anionic surfactant (0.2 g) was prepared separately. The emulsion polymerization was carried out in a 100 ml round bottom flask with three necks equipped with a magnetic stirrer, temperature control device, condenser, monomer and initiator feed lines and a nitrogen inlet. Deionized water (30 g) was introduced into the reaction flask at room temperature. The contents were heated to 60° C. while stirring under nitrogen purge. The aqueous dispersion of the

TABLE 12

| Example 12 preparation variables, characteristics and product addition polymer characteristics. | | | | |
|---|---|---|---|---|
| final polymer sample no. | 12.a | 12.b | 12.c | 12.d |
| protective substance sample no. | 10.b | 10.b | 10.d | 10.i |
| protective substance weight, g | 20 | 20 | 20 | 20 |
| Example 4 organometallic catalyst component soln., mL | 40 | 40 | 40 | 40 |
| compatibilizer BDpBA amount, g | — | 12 | — | 12 |
| rotor-stator speed during preparation of the protected catalytic dispersion, rpm | 200 | 200 | 200 | 200 |
| rotor-stator mixing time for preparation of the protected catalytic dispersion, sec | 120 | 120 | 120 | 120 |
| protected catalytic dispersion ave. droplet diam.[a], microns (no fugitive subs.)a | 50 | 50 | 50 | 50 |
| Me-β-CD, g (active) | 6 | 6 | 6 | 6 |
| weight of norbornene fed to the pressure reactor[a], g | 300 | 300 | 300 | 300 |
| weight of methyl acrylate fed to the pressure reactor[a], g | 300 | 300 | 300 | 300 |
| weight of methacrylic acid fed to the pressure reactor[a], g | — | — | — | — |
| % of total monomers converted to polymer[a], weight % | 80 | 80 | 80 | 80 |
| average particle diam. for final polymer dispersion[a], microns | 146 | 146 | 146 | 146 |
| total polymer in final dispersion, based on final dispersion[a], wt % | 44 | 44 | 44 | 44 |
| copolymer in final dry polymer[a], weight % | 96 | 96 | 96 | 96 |
| Mn of copolymer ($\times 10^3$) | 18 | 18 | 18 | 18 |
| Mw of copolymer ($\times 10^3$) | 7 | 7 | 7 | 7 |
| Mw/Mn of copolymer ($\times 10^3$) | 2.5 | 2.5 | 2.5 | 2.5 |

[a]These are values that should be observed by analytical techniques.

cobalt catalyst in the protective substance was added to the water at 60° C. followed by the monomer emulsion. A redox initiator system with $FeSO_4$ (1 g of a 0.1% solution), t-butyl hydroperoxide (0.7 g in 1 g of water) and isoascorbic acid (0.35 g in 2 g of water) was added to the reaction mixture. The temperature was maintain at 63° C. for 1 hour followed by a second shot of initiator of t-butyl hydroperoxide (0.35 g in 1 g of water) and isoascorbic acid (0.17 g in 2 g of water). After 30 minutes at 60° C., the reaction mixture was cooled to room temperature. The conversion was >99% based on the solids level of 28.7%. Molecular weight of the poly-methyl methacrylate was measured at Mw/Mn 152905/98545 which attributed to a chain transfer constant (Cs) of ~30 for the cobalt catalytic chain transfer agent under these conditions.

EXAMPLE 14

Regulation of molecular weight during free radical emulsion polymerization by protected catalytic composition containing a transition metal chain transfer catalyst. An aqueous dispersion of a cobalt catalytic chain transfer catalyst in the protective substance was used as a seed in the emulsion polymerization of methyl methacrylate. The dispersion was prepared by dissolving 0.003 g of Co(II)-MePhBF in 3 g of the protective substance 1.h. The protective substance was added to 4.5 g of water and 0.3 g of Tergital 15-S-5 and the mixture was emulsified by using a homogenizer. A monomer emulsion of methyl methacrylate (16 g), water (8 g) and anionic surfactant (0.2 g) was prepared separately.

The emulsion polymerization was carried out in a 100 ml round bottom flask with three necks equipped with a magnetic stirrer, temperature control device, condenser, monomer and initiator feed lines and a nitrogen inlet. Deionized water (30 g) was introduced into the reaction flask at room temperature. The contents were heated to 60° C. while stirring under nitrogen purge. The aqueous dispersion of the cobalt catalyst in the protective substance was added to the water at 60° C. followed by the monomer emulsion. A redox initiator system with $FeSO_4$ (1 g of a 0.1% solution), t-butyl hydroperoxide (0.7 g in 1 g of water) and isoascorbic acid (0.35 g in 2 g of water) was added to the reaction mixture. The temperature was maintained at 63° C. for 1 hour followed by a second shot of initiator of t-butyl hydroperoxide (0.35 g in 1 g of water) and isoascorbic acid (0.17 g in 2 g of water). After 30 minutes at 60° C., the reaction mixture was cooled to room temperature. The conversion was >99% based on the solids level of 28.7%. Molecular weight of the poly-methyl methacrylate was measured at Mw/Mn 152905/98545 which attributed to a chain transfer constant (Cs) of ~30 for the cobalt catalytic chain transfer agent under these conditions.

EXAMPLE 15

Preparation of a protected catalytic composition and its use in preparing ethylene/methyl acrylate copolymer. This Example 15 preparative method was used to prepare samples 15.a-15.d. Specific characteristics of the preparation and of copolymers produced are given in Table 15. An organometallic catalyst component solution was, prepared as follow: to an 8 mL serum vial equipped with a stirring bar, located in a dry glove box under dry nitrogen, was added: 24.1 mg (40.0 μmol) of di(2-methoxyphenyl)phosphinobenzene-2-sulfonato methyl pyridino palladium complex (see FIG. V) +2.25 mL toluene. The mixture was allowed to stir for 10 minutes, affording an off-white mixture.

An Endeavor™ aluminum pressure reactor, fitted with an internal glass sleeve having a 13 mL capacity, a catalyst injection inlet port, a gas inlet/vent port, and a magnetically coupled mechanical stirrer, was rendered dry in the glove box under dry nitrogen. The polymerization was carried out in the pressure reactor inside the glove box under dry nitrogen. Methyl acrylate (1.0 mL) was charged to the pressure reactor, followed by 4.0 mL of an anhydrous solution of 2.0 g of protective substance 2.b.6 in 25 mL toluene. The reactor was then heated to the reaction temperature (Table 15) and pressurized with ethylene to a gauge pressure of 685 kPa (400 psig). After equilibration, the organometallic catalyst component solution was injected by syringe into the reactor followed by a toluene (0.5 mL) rinse. After a 60 minute hold, during which the ethylene pressure was maintained constant at 685 kPa, the pressure reactors were cooled to room temperature and the glass sleeves were removed from the glove box. The contents of each glass sleeve were added to rapidly stirred methanol (~100 mL) and stirred overnight. The materials were then vacuum filtered, washed with methanol, and dried at 60° C. under vacuum for 18 hours. Example 15 preparations show that the organometallic catalyst component is stable to the protective substance.

TABLE 15

Example 15 preparation variables, characteristics and product addition polymer characteristics.

| Final polymer sample Number | 15.a | 15.b | 15.c | 15.d |
|---|---|---|---|---|
| protective substance sample no. | 2.b.6 | 2.b.6 | 2.b.6 | 2.b.6 |
| polymerization temperature (° C.) | 70 | 80 | 90 | 100 |
| Yield of polymer (g) | 0.33 | 0.95 | 1.04 | 1.17 |
| Activity (g polymer/mmol organometallic catalyst component | 41.25 | 118 | 130 | 146 |

We claim:

1. An aqueous protected catalytic composition dispersion comprising particles of a protected catalytic composition and a transport agent dispersed in an aqueous medium, wherein said protected catalytic composition comprises a) a protective substance;

b) an organometallic catalyst component; and b) optionally a fugitive substance;

wherein said protective substance is a polymer selected from poly(non-polar olefins), poly(polar olefins), poly[(polar-olefin)-(non-polar olefins)] and combinations thereof; wherein the polymer is fully saturated; wherein the polymer has i) a crystallinity at 25° C. of 0 to 25% by weight, based on the total weight of said protective substance; ii) a number average molecular weight of at least 1,000 g/mole and no more than 100,000 g/mole; iii) a water solubility at 25° C. of 0 to 150 millimoles of monomer present, as polymerized units, in said polymer/liter of water; and iv) a viscosity of at least 1 centipoise and no more than 1,000,000 centipoise at 25° C.; wherein said fugitive substance is miscible with said protective substance and has a boiling point at 101 kPa of at least −165° C. and no more than 80° C.; wherein said protected catalytic composition has a viscosity of at least 1 centipoise and no more than 10,000 centipoise at 25° C.; wherein said protective substance is a fully saturated polymer; wherein the organometallic catalyst component is water sensitive; wherein the protective substance protects the organometallic catalyst component from decomposition upon exposure of the protected catalytic composition to water; and, wherein the transport agent is a cyclodextrin.

2. The aqueous protected catalytic composition dispersion of claim 1, further comprising:

a total monomer charge;

wherein the weight ratio of cyclodextrin to monomer in the total monomer charge is at least 1:1,000 and no more than 10:100.

3. The aqueous protected catalytic composition dispersion of claim 2, wherein the total monomer charge comprises ethylenically unsaturated monomer.

4. A method for preparing a protected catalytic composition comprising:

A) providing a protective substance; and

B) combining said protective substance with an organometallic catalyst component and, optionally, a fugitive substance, to form a protected catalytic composition;

C) mixing said protected catalytic composition with an aqueous medium, a dispersant, a transport agent, and, optionally, a thicker, to form an aqueous protected catalytic composition dispersion comprising droplets of said protected catalytic composition; and D) when said fugitive substance is present in said aqueous protected catalytic composition, removing said fugitive substance from said aqueous protected catalytic composition;

wherein said protective substance is a polymer selected from poly(non-polar olefins), poly(polar olefins), poly[(polar olefin)-(non-polar olefins)] and combinations thereof; wherein the polymer is fully saturated; wherein the polymer has a) a crystallinity at 25° C. of 0 to 25% by weight, based on the total weight of said protective substance; b) a number average molecular weight of at least 1,000 g/mole and no more than 100,000 g/mole; c) a water solubility at 25° C. of 0 to 150 millimoles of monomer present, as polymerized units, in said protective substance/liter of water; and d) a viscosity of at least 1 centipoise and no more than 1,000,000 centipoise at 25° C.; wherein said fugitive substance is miscible with said protective substance and has a boiling point at 101 kPa of at least −165° C. and no more than 80° C.; wherein said protected catalytic composition has a viscosity of at least 1 centipoise and no more than 10,000 centipoise at 25° C.; wherein said protective substance is a fully saturated polymer; wherein the organometallic catalyst component is water sensitive; wherein the protective substance protects the organometallic catalyst component from decomposition upon exposure of the protected catalytic composition to water; and, wherein the transport agent is a cyclodextrin.

5. The method of claim 4, wherein said organometallic catalyst component is an organometallic complex comprising:

one or more metals independently selected from Fe, Co, Ni, Pd, Rh, and Cu; and one or more chelating ligands;

wherein the organometallic catalyst component has a neutral or cationic charge.

6. The method of claim 5, wherein said chelating ligands comprise at least two heteroatoms independently selected from P, N, O, and S.

7. The method of claim 4 wherein said protective substance is a polymer having one or more terminal or pendant secondary alkoxy moieties.

8. The method of claim 4, wherein said thickener is selected from: alkali soluble (meth)acrylic emulsions; hydrophobically modified alkali soluble (meth)acrylic emulsions; hydrophobically modified polyurethane thickeners; cellulosic thickeners; polyvinyl alcohols; polyacrylamides; polyacids, and combinations thereof.

9. The method of claim 4, further comprising:

E) contacting said protected catalytic composition with an ethylenically unsaturated monomer; and F) polymerizing at least a portion of said ethylenically unsaturated monomer to form an aqueous addition polymer dispersion comprising polymer particles comprising addition polymer.

10. The method of claim 4, wherein said step of mixing is accomplished by homogenization; and wherein said plural droplets of said protected catalytic composition have an average diameter of at least 10 nm and no more than 1,000 nm.

* * * * *